(12) United States Patent
Nakayama

(10) Patent No.: US 9,529,493 B2
(45) Date of Patent: Dec. 27, 2016

(54) TERMINAL, IMAGE DISPLAY METHOD AND PROGRAM FOR DISPLAYING MUSIC-RELATED IMAGES

(75) Inventor: Ryuji Nakayama, San Mateo, CA (US)

(73) Assignees: SONY CORPORATION, Tokyo (JP); SONY INTERACTIVE ENTERTAINMENT INC., Tokyo (JP)

( * ) Notice: Subject to any disclaimer, the term of this patent is extended or adjusted under 35 U.S.C. 154(b) by 1167 days.

(21) Appl. No.: 12/606,314

(22) Filed: Oct. 27, 2009

(65) Prior Publication Data

US 2010/0110072 A1    May 6, 2010

(30) Foreign Application Priority Data

Oct. 31, 2008  (JP) .................................. 2008-282404
Jul. 30, 2009  (JP) .................................. 2009-177326

(51) Int. Cl.
| | | |
|---|---|---|
| G06T 15/00 | (2011.01) |
| G06F 3/0482 | (2013.01) |
| G06F 3/0481 | (2013.01) |
| G06T 13/20 | (2011.01) |
| G06T 13/60 | (2011.01) |

(52) U.S. Cl.
CPC ......... *G06F 3/0482* (2013.01); *G06F 3/04815* (2013.01); *G06T 13/205* (2013.01); *G06T 13/60* (2013.01)

(58) Field of Classification Search
None
See application file for complete search history.

(56) References Cited

U.S. PATENT DOCUMENTS

| | | | |
|---|---|---|---|
| 6,563,999 | B1 | 5/2003 | Suzuoki |
| 7,257,536 | B1 * | 8/2007 | Finley et al. ................. 704/270 |
| 7,581,186 | B2 * | 8/2009 | Dowdy et al. ................ 715/727 |
| 2004/0068536 | A1 * | 4/2004 | Demers et al. ............... 709/201 |
| 2005/0010599 | A1 * | 1/2005 | Kake et al. ................. 707/104.1 |
| 2006/0156906 | A1 * | 7/2006 | Haeker ........................... 84/609 |
| 2007/0219937 | A1 * | 9/2007 | Lee et al. .......................... 707/1 |
| 2007/0274607 | A1 * | 11/2007 | Huang et al. ................. 382/276 |

FOREIGN PATENT DOCUMENTS

| | | |
|---|---|---|
| JP | 2004-29047 | 1/2004 |
| JP | 2004-38398 | 2/2004 |
| JP | 2007-34663 | 2/2007 |
| JP | 2008-257052 | 10/2008 |

OTHER PUBLICATIONS

Notification of Reason(s) for Refusal dated Aug. 28, 2012, from corresponding Japanese Application No. 2009-177326.

* cited by examiner

*Primary Examiner* — Weiming He
(74) *Attorney, Agent, or Firm* — Katten Muchin Rosenman LLP

(57) ABSTRACT

A jacket image receiver acquires data for music to be played back and, in addition, a related image related to the music. A three-dimensional image generating unit displays the related image related to music played back in the past along with the related image related to the music currently played back, arranging the images in a three-dimensional space. The three-dimensional image generating unit flickers an image representing a water surface in order to create a visual effect that makes the related images appear floating on the water surface.

10 Claims, 23 Drawing Sheets

TERMINAL, IMAGE DISPLAY METHOD AND PROGRAM FOR DISPLAYING MUSIC-RELATED IMAGES

BACKGROUND OF THE INVENTION

1. Field of the Invention

The present invention relates to a terminal that uses music delivery service and an image display method for displaying an image related to the delivered music.

2. Description of the Related Art

Opportunities for listening to music via the Internet using a site for streaming delivery of music are growing. There are a large number of Internet radio sites that deliver music programs in real time using the Internet protocol. When a connection is made to a site and a channel is selected, a stream of music is delivered to a personal computer so that the music can be played back and listened to in real time.

Patent document No. 1 discloses a game device capable of playing back music.

[patent document No. 1] U.S. Pat. No. 6,563,999

In the related-art music delivery service such as Internet radio, a variety of software for receiving and playing back delivered music is supplied. The software is primarily intended for playback of music delivered in real time and is not necessarily provided with an attractive interface. Generally, software currently available is not provided with a user interface for searching for music delivered in the past or listening to a sample.

SUMMARY OF THE INVENTION

The present invention addresses the problem and a purpose thereof is to provide a user interface for using music delivery service.

In order to solve the problem, a computer program embedded in a computer readable medium according to one embodiment of the present invention comprises: a module operative to display a related image related to music sequentially played back, arranging the image in a three-dimensional virtual space; and a module operative to flicker an image representing a water surface in order to create a visual effect that makes the related image appear floating on the water surface.

Another embodiment of the present invention relates to a terminal apparatus. The terminal apparatus comprises: an acquisition unit operative to acquire data for music to be played back and, in addition, a related image related to the music; and a three-dimensional image generating unit operative to display the related image related to music played back in the past along with the related image related to the music currently played back, arranging the images in a three-dimensional space. The three-dimensional image generating unit flickers an image representing a water surface in order to create a visual effect that makes the related images appear floating on the water surface.

Still another embodiment of the present invention relates to an image display method. The method comprises: displaying a related image related to music sequentially played back, arranging the image in a three-dimensional virtual space; and flickering an image representing a water surface in order to create a visual effect that makes the related image appear floating on the water surface.

Optional combinations of the aforementioned constituting elements, and implementations of the invention in the form of methods, apparatuses, systems, computer programs, data structures, and recording mediums may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
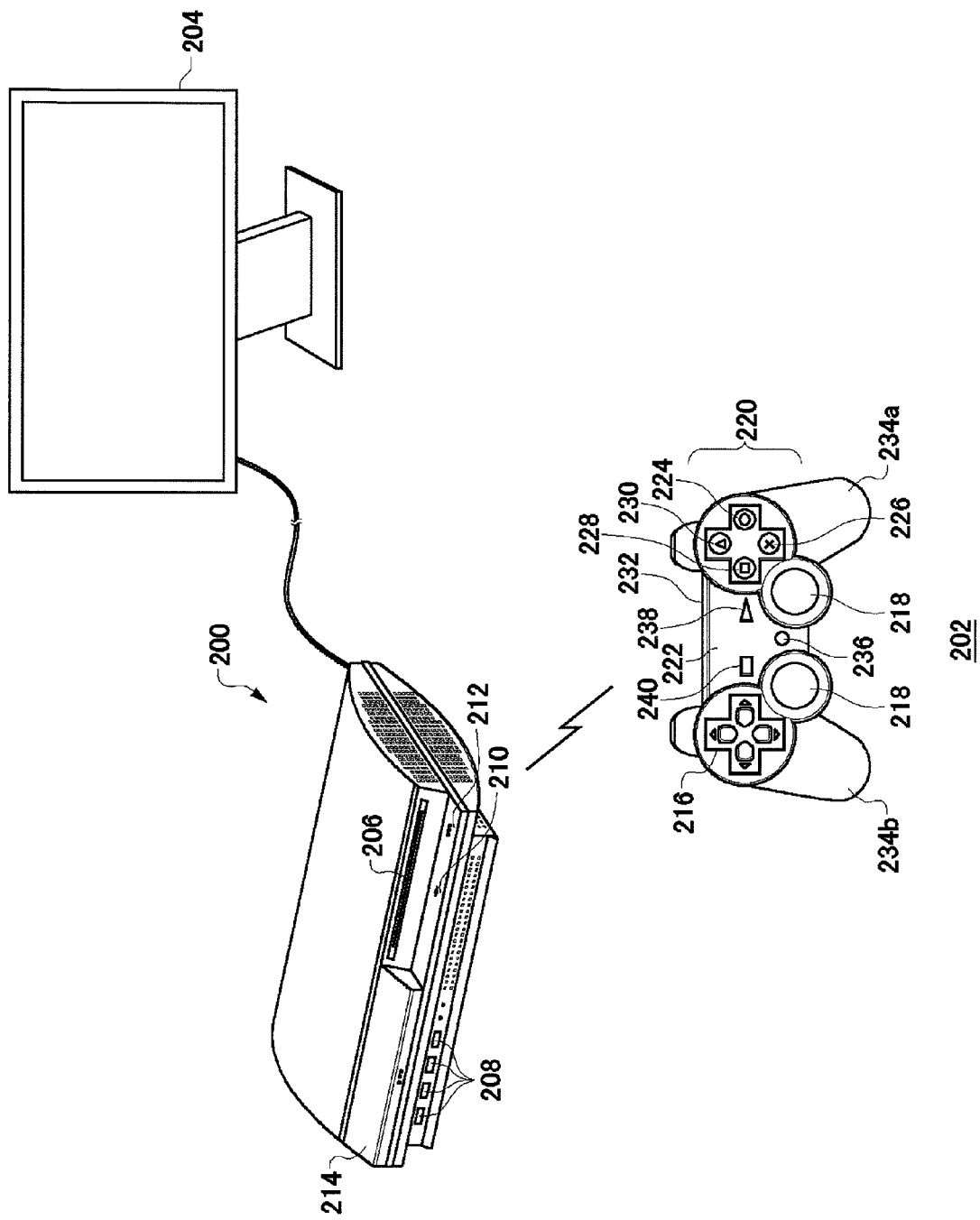
FIG. 1 shows the schematic structure of a game system according to one embodiment of the present invention.

The invention will now be described by reference to the preferred embodiments. This does not intend to limit the scope of the present invention, but to exemplify the invention. FIG. 1 shows the schematic structure of a game system according to one embodiment of the present invention.

The game system of this embodiment is comprised of a game device 200, a controller 202, and a television monitor 204. The game device 200 has functions for executing various games, preparing and editing e-mails, reading Web pages, playing movies and music, and so on. The controller 202 is wirelessly connected to the game device 200. The television monitor 204 is connected with the game device 200 to display game contents, Web pages, movies, etc., and output sounds.

[General Configuration of Game Device]

The game device 200 is provided with a disk insertion slot 206 compatible with optical disks having a diameter of 12 cm, a USB connection terminal 208, etc. The disk insertion slot 206 is configured such that optical disks such as a blue-ray disk (BD) (trademark or registered trade mark), a DVD-ROM, and a CD-ROM can be loaded in the slot. A touch sensor 201 is a sensor for unloading a disk. A touch sensor 212 is a sensor for turning the power on or off. A power switch, an audio and video output terminal, an optical digital output terminal, an AC power input terminal, a LAN port, an HDMI terminal, etc. (not shown) are provided at the rear side of the game device 200. The device may also be provided with an IEEE1394 terminal and be configured to be capable of communicating in the IEEE1394 scheme.

The game device 200 is also provided with a multimedia slot. A multimedia slot case 214 is formed as a lid member (not shown) and is configured such that the multimedia slot is exposed when the multimedia device 214 is opened.

The game device 200 executes various processes for carrying out games, preparing, editing, and receiving e-mails, reading Web pages, etc., in accordance with application programs for games, e-mails, and Web browser, and with user's instructions input through the controller 202. Application programs may be read out from a recording medium such as an optical disk (e.g., CD-ROM, DVD-ROM, or BD), a hard disk drive, or a semiconductor memory. Alternatively, they may be downloaded through a transmission medium such as a LAN or CATV.

The game device 200 can not only execute the processes for carrying out games, preparing, editing, and receiving e-mails, reading Web pages, etc., according to the application programs, but also play back (decode), for example, audio data recorded on a CD and video and audio data such as a movie recorded on a DVD or BD. The video game machine 200 can operate according to various application programs other than the above. A driver program for playing back a DVD or BD is recorded in a hard disk drive 334 built in, for example, the game device 200.

[General Construction of Controller]

The controller 202 is driven by a not-shown battery, and includes a plurality of buttons and keys for making operation inputs for game progress. When the user operates the buttons and keys on the controller 202, the operation inputs are transmitted to the game device 200 wirelessly or by cable.

The controller 202 has an arrow key 216, analog sticks 218, and four types of operation buttons 220. The arrow key 216, the analog sticks 218, and the operation buttons 220 constitute an input unit which is arranged on the case top 222. The four types of buttons 224, 226, 228, and 230 are marked with different symbols in different colors in order to distinguish them from each other. More specifically, the circle button 224 is marked with a red circle, the cross button 226 a blue cross, the square button 228 a purple square, and the triangular button 230 a green triangle. The rear 232 of the case of the controller 202 is provided with a plurality of LEDs (not shown).

The user holds a left grip 234b with the left hand and a right grip 234a with the right hand when operating the controller 202. The arrow key 216, the analog sticks 218, and the operation buttons 220 are arranged on the case top 222 so that they can be operated by the user who is holding the left grip 234b and the right grip 234a.

An LED button 236 is also provided on the case top 222. The LED button 236 is used, for example, to display a menu screen on the game device 200. It also has the functions of notifying the user of incoming mails, and indicating the battery level and other status of the controller 202 by modifying the lighting status of the LED. For example, the LED is lit in red during charging, lit in green when fully charged, and blinks in red when the battery level is low.

The arrow key 216 is provided with "up", "down", "left" and "right" directional keys operated by the user when, e.g., moving a game character of a game upward, downward, leftward and rightward, moving in the respective directions a cursor on a screen, e.g., a letter input cursor on an e-mail preparing screen, or scrolling to read a Web page. In addition, these "up", "down", "left" and "right" directional keys can be used to move the game character or cursor not only vertically and horizontally, but also obliquely. The user can issue an instruction to the game device 200 to move in an obliquely right upward direction by pressing the "up" directional key together with the "right" directional key. The same will apply to the other directional keys, and the user can issue an instruction to move in an obliquely left downward direction by pressing the "down" directional key together with the "left" directional key.

The operation buttons 220 are assigned various functions depending on the game application programs. For example, the triangular button 230 is assigned a function for demanding menu display, the cross button 226 is assigned a function for canceling selected items, the circular button 224 is assigned a function for determining selected items, and the square button 228 is assigned a function for designating display/non-display of, for example, the table of contents.

The analog joystick 218 has a rotary operational element which can be inclined in an arbitrary direction around a supporting point of the axis of operation, and a variable analog value output means for outputting variable analog values corresponding to the operation of the rotary operational element. The rotary operational element is attached to the top end of the axis of operation which is designed to return to the neutral position with the aid of an elastic member. The rotary operational element keeps an upright posture (non-inclined posture) and remain in such position (reference position) when the element is not inclined for operation by the user. The variable analog value output means typically has a variable resistor element. The resistivity value of the variable resistor element can vary depending on the operation of the rotary operational element. When the rotary operational element of the analog joystick 218 is inclined for operation, the controller 202 detects a coordinate value on an X-Y coordinate, based on the amount and direction of the inclination from the reference position, and the coordinate value is supplied as an operational output to the game device 200.

The controller 202 is further provided with a select button 240, a start button 238, etc. The start button 238 is used, e.g., when the user instructs the game device 200 to start a game, display an e-mail screen, or play a movie or music, or pause the game or the play of the movie or music. The select button 240 is used, e.g., when the user instructs the game device 200 to, for example, select in the menu displayed on the television monitor 204.

The controller 202 is also provided with a vibration generation mechanism within the left and right grips 234a and 234b. The vibration generation mechanism has a weight eccentrically mounted with respect to the axis of rotation of a motor. Rotation of the weight using the motor can generate vibration of the controller 202. The vibration generation mechanism is activated when prompted by the game device 200. The controller 202 transmits vibration to the user's hands by activating the vibration generation mechanism.

[Internal Configuration of Video Game Machine]

The internal circuit configuration of the game device 200 will be described below.

Figure 2:
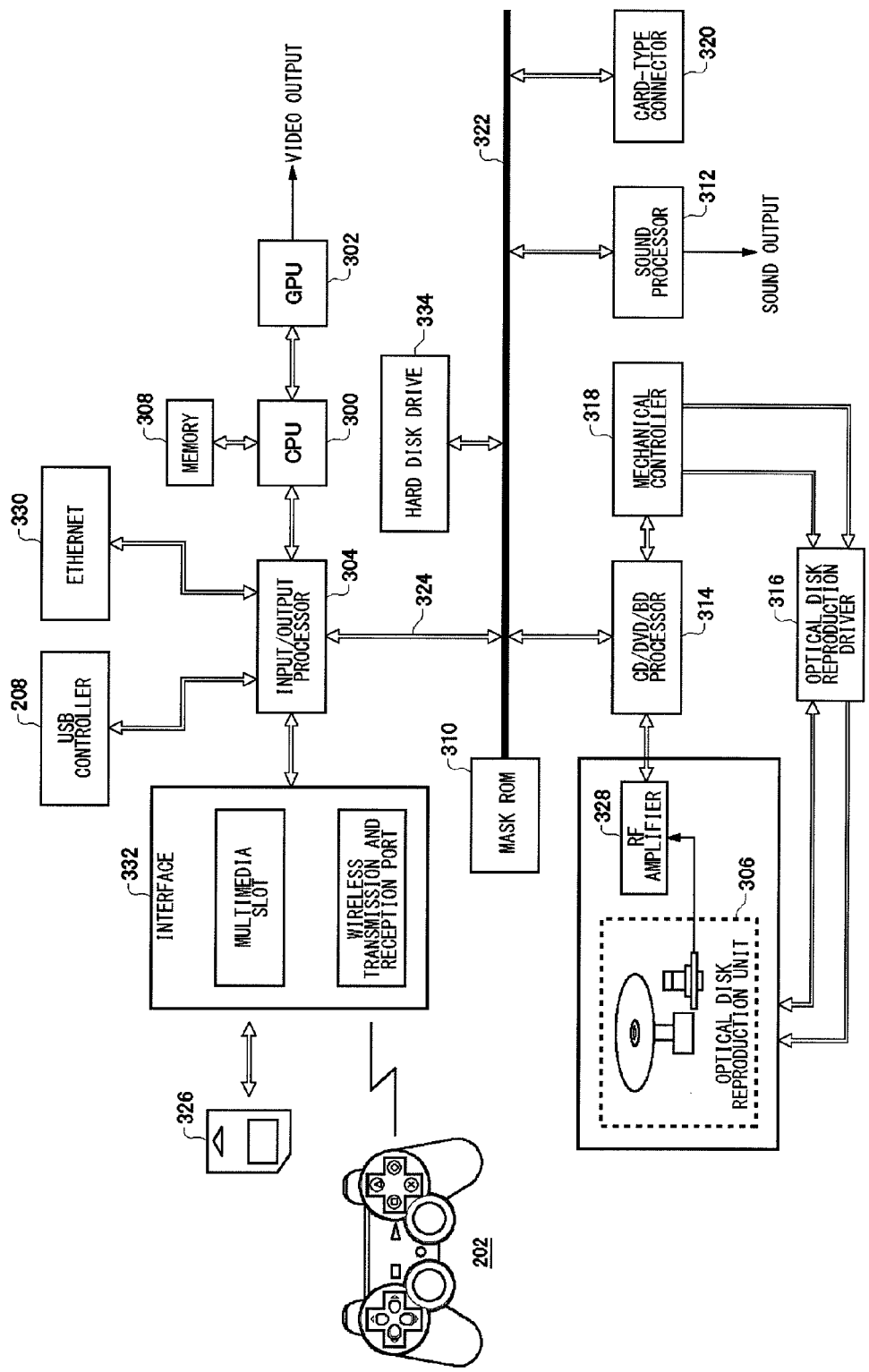
FIG. 2 is a block circuit diagram showing the schematic structure of the internal circuit of the game device.

FIG. 2 is a block circuit diagram showing the schematic structure of the internal circuit of the game device. The game device 200 includes, as its principal components, a main CPU 300, a graphic processor unit (GPU) 302, an input/output processor 304, an optical disk reproduction unit 306, a main memory 308, a MASK ROM 310, and a sound processor 312. The main CPU 300 performs signal processing and control of various internal components based on various programs such as application programs for games, e-mails, and a Web browser. The GPU 302 performs image processing. The input/output processor 304 performs interfacing or processing to maintain downward compatibility between external devices and the internal components of the device. The optical disk reproduction unit 306 reproduces an optical disk, such as a BD, DVD or CD, having an application program or multimedia data recorded therein. The main memory 308 serves as a work area for the main CPU 300 and a buffer for temporarily storing data read out from an optical disk. The MASK ROM 310 stores therein operating system programs to be executed mainly by the main CPU 300 and the input/output processor 304. The sound processor 312 performs audio signal processing.

The game device 200 is further provided with a CD/DVD/BD processor 314, an optical disk reproduction driver 316, a mechanical controller 318, a hard disk drive 334, and a card-type connector (e.g., PC card slot) 320. The CD/DVD/BD processor 314 performs, e.g., error correction processing (e.g., cross interleave Reed-Solomon coding: CIRC), expansion decoding processing, and so on, to a disk reproduction signal read out from a CD, DVD, or BD by the optical disk reproduction unit 306 and then amplified by an RF amplifier 328, thereby reproducing (reconstructing) data recorded on the CD, DVD, or BD. The optical disk reproduction driver 316 and the mechanical controller 318 perform rotation control of a spindle motor of the optical disk reproduction unit 306, focus/tracking control of an optical pickup, loading control of a disk tray, etc.

For example, the hard disk drive 334 stores saved data for the application program or the game read by the optical disk reproduction unit 306, or stores data such as photos, moving images, and music acquired via the input and output processor 304. The card-type connector 320 is a connection port for a communication card, an external hard disk drive, or the like.

These components are connected with each other mainly through bus lines 322, 324, etc. The main CPU 300 and the GPU 302 are connected with each other through a dedicated bus line. Additionally, the main CPU 300 and the input/output processor 304 are connected with each other through an SBUS. The input/output processor 304, the CD/DVD/BD processor 314, the MASK ROM 310, the sound processor 312, the card-type connector 320, and the hard disk drive 324 are connected with each other through the SSBUS.

The main CPU 300 executes an operating system program for the main CPU stored in the MASK ROM 310 to control the entire operation of the game device 200. Further, the main CPU 300 reads from an optical disk such as a CD, DVD, or BD and loads the content into the main memory 308. Furthermore, the main CPU 300 executes various application programs to control operations for playing a game, preparing or editing an e-mail, reading a Web page, etc.

The input/output processor 304 executes an operating system program for the input/output processor stored in the MASK ROM 310 to control signals from the controller 202 based on operations by the operator, and data input/output between the game device 200 and a memory card 326 storing therein a setting of a game, the contents and addresses of e-mails, the URLs of Web sites, or the like. The input/output processor 304 further controls data input/output between the USB connection terminal 208 and the game device 200, data input/output between an Ethernet 330 and the game device 200, data input/output between the IEEE 1394 terminal (not shown) and the game device 200, data input/output between the PC card slot (not shown) and the game device 200, and so on. Further, the input/output processor 304 performs data input and output between the device 200 and the memory card 326 via the PC card slot (not shown). Information from the controller 202 and the memory card is exchanged via an interface 332 that includes a multimedia slot and a wireless communication port.

The GPU 302 has a function of a geometry transfer engine for coordinate conversion and so on, and a function of a rendering processor. The GPU 302 draws an image according to rendering instructions from the main CPU 300 and then stores the drawn image into a non-illustrated frame buffer. More specifically, in the case that various application programs stored on an optical disk use three-dimensional (3D) graphics such as those of a game, the GPU 302 calculates, in a geometry operation process, the coordinates of polygons to constitute a three-dimensional object. Further, the GPU 302 performs, in a rendering process, various calculations to make an image that may be obtained by shooting the three-dimensional object by a virtual camera, i.e., the GPU 302 performs a perspective conversion (calculation of the coordinate values of the vertexes of each polygon constituting the three-dimensional object when the vertexes are projected on a virtual camera screen, and so on). The GPU 302 finally writes the obtained image data into the frame buffer. The GPU 302 then outputs a video signal corresponding to the thus made image.

The sound processor 312 has an ADPCM (Adaptive Differential Pulse Code Modulation) decoding function, an audio signal reproducing function, a signal modulating function, etc. The ADPCM decoding function is a function of reading out waveform data from a non-illustrated sound buffer incorporated in or externally connected with the sound processor 312, to reproduce and output an audio signal for, e.g., sound effects. The signal modulating function also serves as a sampling sound source for producing an audio signal for, e.g., music sounds, sound effects or the like from waveform data stored in the sound buffer.

For example, when the game device 200 constructed as described above is turned on, the operating system programs for the main CPU 300 and the input/output processor 304 are read out from the MASK ROM 310. These read-out operating system programs are executed by the main CPU 300 and the input/output processor 304, respectively. By executing the operating system program, the main CPU 300 controls each component of the game device 200. On the other hand, the input/output processor 304 controls signal input/output between the controller 202, the memory card 326, or the like, and the game device 200. Also, by executing the operating system program, the main CPU 300 performs initialization such as operation check and so on. The main CPU 300 then controls the optical disk reproduction unit 306 to read out an application program for a game or the like from an optical disk. After loading the application program in the main memory 308, the main CPU 300 executes the program. By executing the application program, the main CPU 300 controls the GPU 302 and the sound processor 312 following the operator's instructions received through the controller 202 and the input/output processor 304 to control image display and production of a sound effect, a music sound, or the like.

Also, in the case that the game device reproduces, e.g., a movie recorded on an optical disk, the main CPU 300 controls the GPU 302 and the sound processor 312 following the operator's instructions (commands) received through the controller 202 and the input/output processor 304 to control image display and production of a sound effect, a music sound, or the like, of the movie being reproduced from the optical disk.

Figure 3:
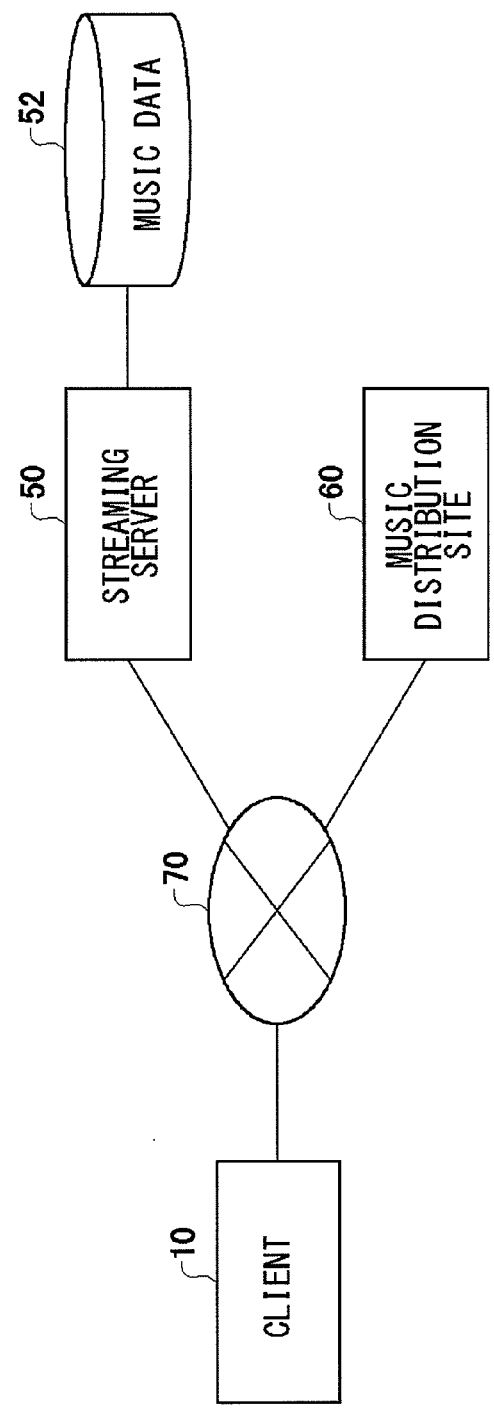
FIG. 3 shows the configuration of an Internet radio system according to an embodiment of the present invention.

FIG. 3 shows the configuration of an Internet radio system according to an embodiment of the present invention. A streaming server 50 delivers a music stream stored in a music data storage 52 to a client 10 via a network 70 such as the Ethernet 330. The client 10 receives and plays back the music delivered by the streaming server as if it receives radio waves.

The data storage 52 of the streaming server 50 stores the image of a CD/DVD jacket for the music delivered by streaming. The image of a CD/DVD jacket is transmitted to the client 10 when the streaming of music is started. The client 10 not only receives and plays back the music stream but also receives the image of a CD/DVD jacket corresponding to the music delivered by streaming and displays the image on a screen. For music not sold in the form of a CD/DVD medium, some image associated with the music may be used as "jacket image" instead of the image of a CD/DVD jacket.

The client 10 also provides a user interface that prompts the user to purchase the CD/DVD corresponding to the music delivered by streaming. When the user selects a favorite piece of music delivered by streaming and activates a button prompting the purchase of the CD/DVD, the client 10 is connected to a music distribution site 60 via the network 70, allowing the user to purchase the CD/DVD of the music at the music sales site. Music may be sold in the form of a recording medium such as a CD or a DVD. Alternatively, music may be sold in the form of downloadable, compression-encoded data such as MP3.

Figure 4:
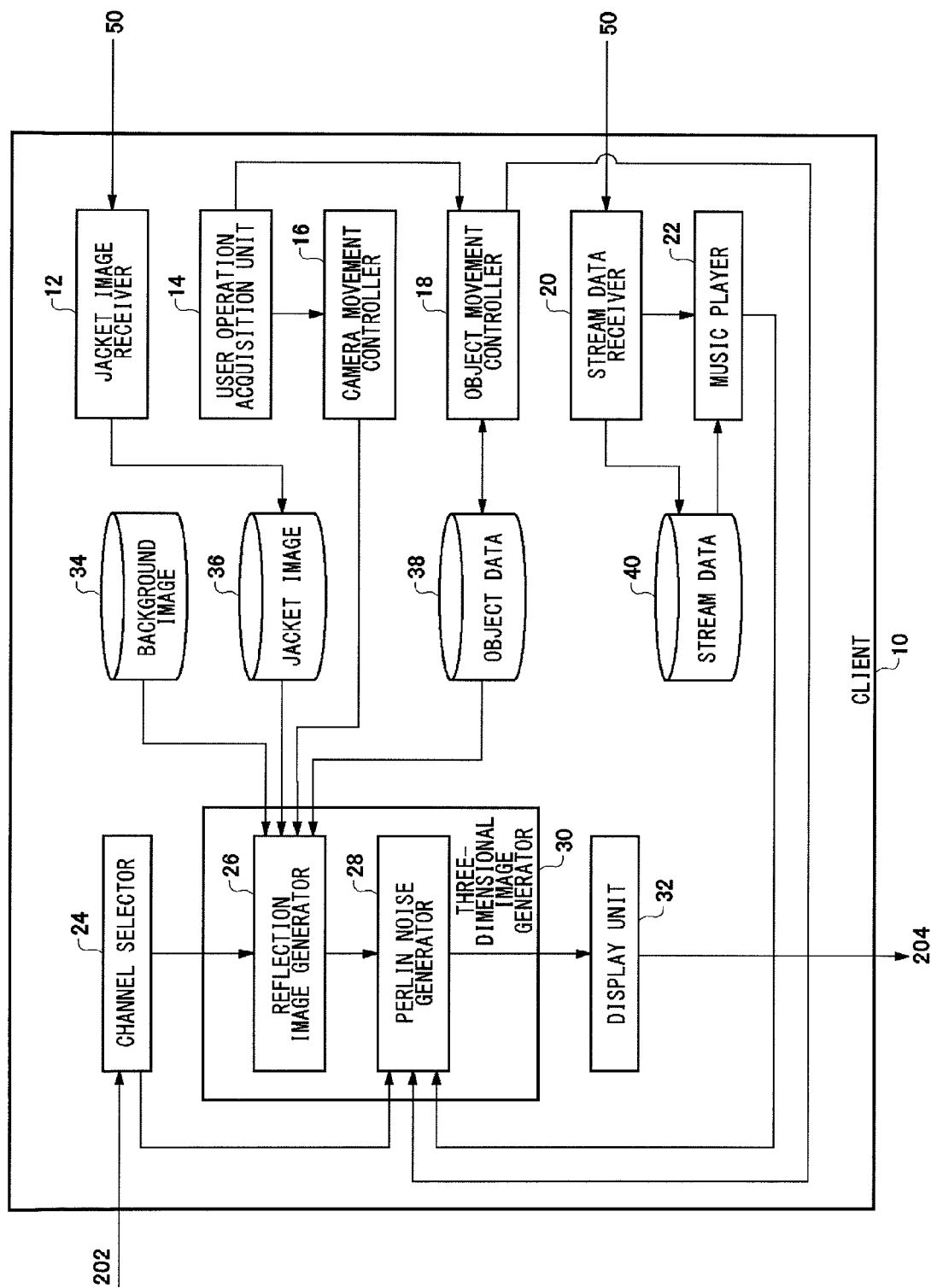
FIG. 4 shows the configuration of the client of FIG. 3.

FIG. 4 shows the configuration of functions of the client 10. The client 10 is configured to be implemented in the aforementioned game device 200. The functional blocks of the Internet radio system are implemented by modules of the application program loaded into the main memory 308 and mainly executed by the main CPU 300 and the GPU 302 of the game device 200.

A stream data receiver 20 receives data for a music stream currently delivered from the streaming server 50 via the Ethernet 330 and stores the data in a stream data storage 40. The stream data storage 40 is implemented as, for example, a part of the hard disk drive 334.

The stream data storage 40 stores the data for music streams delivered in the past while the storage capacity of the hard disk drive 334 permits. When the data exceeds the capacity permitted by the hard disk drive 334, older data are sequentially deleted. The stream data storage 40 also stores history information on the music delivered in the past. The history information includes identification information identifying the stream data for the tunes, the titles of the tunes, the names of the artists, identification information on jacket image files, etc. Even if the past music stream is deleted from the stream data storage 40, the history information remains. Thus, when the past music stream once deleted becomes necessary, the stream data can be acquired again by acquiring the identification information on the stream by referring to the history information and notifying the streaming server 50 of the identification information on the stream and requesting the stream accordingly.

A music player 22 reads the stream data from the stream data storage 40 and reproduces the sound by decoding the data in the sound processor 312.

A jacket image receiver 12 receives a jacket image corresponding to the music stream currently delivered from the stream server 50 and stores the image in a jacket image storage 36, which is a part of the hard disk drive 334.

The client 10 not only displays a jacket image of the music currently delivered but also displays a jacket image of the music delivered in the past on a screen such as the television monitor 204. Jacket images for the music delivered hitherto are displayed such that, given the jackets of the music CDs and DVDs are laid out as objects in a three-dimensional virtual space, the three-dimensional versions of the jacket images for the music delivered hitherto, as viewed in the direction of sight from the position of a virtual camera, are generated. This is achieved by, for example, computation in the GPU 302 according to an instruction from the CPU 300.

The client 10 also displays a background image suitable for the type of the music (e.g., genre and mood) currently delivered on the television monitor 204 or the like. The client 10 also generates a reflection image in which the background image or the jacket image is reflected in an image representing a water surface, in order to create a visual effect that makes the jacket image appear floating on the water surface. By flickering the reflection image by inducing a Perlin noise, an impression is given that the water surface ripples in accordance with the type of music or the beat of music.

The client 10 is also provided with a user interface for searching for a jacket image for the music delivered in the past. The user is allowed to browse jacket images by moving the virtual camera according to the inclination of the analog joystick 218 of the controller 202 with respect to the jackets arranged in the three-dimensional space in the order of delivery, or moving the jacket while fixing the camera position. The user selects a desired jacket image by, for example, pressing the circular button 224 of the controller 202. There is further provided a user interface for purchasing the CD or DVD associated with the selected jacket image.

A detailed description will be given of the configuration related to image processing whereby jackets are displayed in the three-dimensional virtual space and the configuration related to the user interface for browsing jackets.

A user operation acquisition unit 14 acknowledges from the controller 202 the user's operational command for searching for a jacket.

A camera movement controller 16 changes the position and orientation of virtual camera in accordance with the user's operational command. The position and orientation of the virtual camera correspond to the view point and direction of sight of the user viewing the three-dimensional virtual space.

An object movement controller 18 moves the object of a jacket in accordance with the user's operational command. For example, when the user selects a particular jacket using the controller 202, the object movement controller 18 moves the object of the jacket toward the camera in the virtual space. The position information on the object of the jacket is stored in an object data storage 38, which is a part of the hard disk drive 334. In addition to the object of the jacket, the object data storage 38 stores texture objects for displaying the title of the music tune and the name of the artist.

A channel selector 24 acknowledges the selection of a channel of radio broadcast provided by the streaming server 50 from the user manipulating the controller 202. Information on the channel selected by the channel selector 24 is transmitted to the streaming server 50 via, for example, the Ethernet 330. For example, channels are categorized according to the mood of the music. By using the CPU 300 to analyze the components of the music, the music is categorized into several channels such as those for upbeat music, relaxing music, etc. More specifically, the music may be grouped into a total of 12 channels according to the types of mood including Recommended, Energetic, Relax, Mellow, Upbeat, Emotional, Lounge, Dance, and Extreme, and according to three genres including "Favorites", "Shuffle", and "Recently added tune". The streaming server 50 selects the music suitable for the user's preference from the music categorized into the mood corresponding to the channel selected by the user. The server 50 delivers a stream of that music to the client 10. Information on the channel selected by the channel selector 24 is also communicated to a three-dimensional image generator 30.

The three-dimensional image generator 30 generates a three-dimensional image in which the image of the jacket in the three-dimensional virtual space as viewed from the camera position is blended with the background image. A display unit 32 displays the three-dimensional image generated by the three-dimensional image generator 30 on the television monitor 204.

The three-dimensional image generator 30 includes a reflection image generator 26 and a Perlin noise generator 28. The three-dimensional image generator 30 is mainly implemented by performing computation in the GPU 302 in accordance with an instruction from the CPU 300.

The reflection image generator 26 acquires the background image corresponding to the channel selected by the channel selector 24 from a background image storage 34. The background image storage 34 stores background images suitable for the music. The reflection image generator 26 selects a background image suitable for the channel selected by the user. For example, the background image storage 34 is implemented as a part of the hard disk drive 334, and the reflection image generator 26 is mainly implemented by performing computation in the GPU 302 in accordance with an instruction from the CPU 300.

The reflection image generator 26 acquires jacket images for the music delivered hitherto from the jacket image storage 36 and acquires information on the position of the objects of the jackets in the three-dimensional virtual space from the object data storage 38. Further, the reflection image generator 26 acquires information on the position and orientation of the camera from the camera movement controller 16.

The reflection image generator 26 generates the images of the jackets delivered hitherto as viewed from the camera position, on the basis of the position information on the jackets. The generator 26 blends the image thus generated with the background image so as to generate a three-dimensional image. This allows the background image suitable for the music currently delivered behind the jackets delivered hitherto. The reflection image generator 26 displays an image representing a water surface below an array of jackets and causes the background image to be reflected in the water surface image, so as to give an impression that the jackets delivered hitherto float on the water surface. Further, the generator 26 performs a process whereby the images of the jackets are reflected in the water surface image. As a result, the reflection image in which the background and the jacket images are reflected is displayed below the array of jackets.

The Perlin noise generator 28 flickers the image representing the water surface displayed below the array of jackets by inducing a Perlin noise. As parameters for a Perlin noise, the Perlin noise generator 28 uses information on the channel selected by the channel selector 24, the music data generated by the music player 22, and information on the movement of the jacket object provided by the object movement controller 18. Like the reflection image generator 26, the Perlin noise generator 28 is mainly implemented by performing computation in the GPU 302 in accordance with an instruction from the CPU 300.

The Perlin noise generator 28 refers to the channel information indicating the type of music mood and sets the noise parameter so that the noise is large if the mood of the music is "Upbeat" and the noise is small if the mood of the music is "Relax". In addition, the Perlin noise generator 28 uses information on the beat of the music played and sets the noise parameter so that the noise grows large each time a beat occurs. Further, when the object of a jacket is moved, the Perlin noise generator 28 sets the noise parameter so that the noise grows large in the vicinity of the jacket thus moved.

The Perlin noise generator 28 flickers the image of the water surface on which the jackets float, giving an impression that the water surface is moving and rippling. The ripple of the water surface may be different depending on the genre or mood of the music, coordinated with the beat of the music, or coordinated with the movement of the jacket object, giving the user buoyant feeling.

Figure 5:
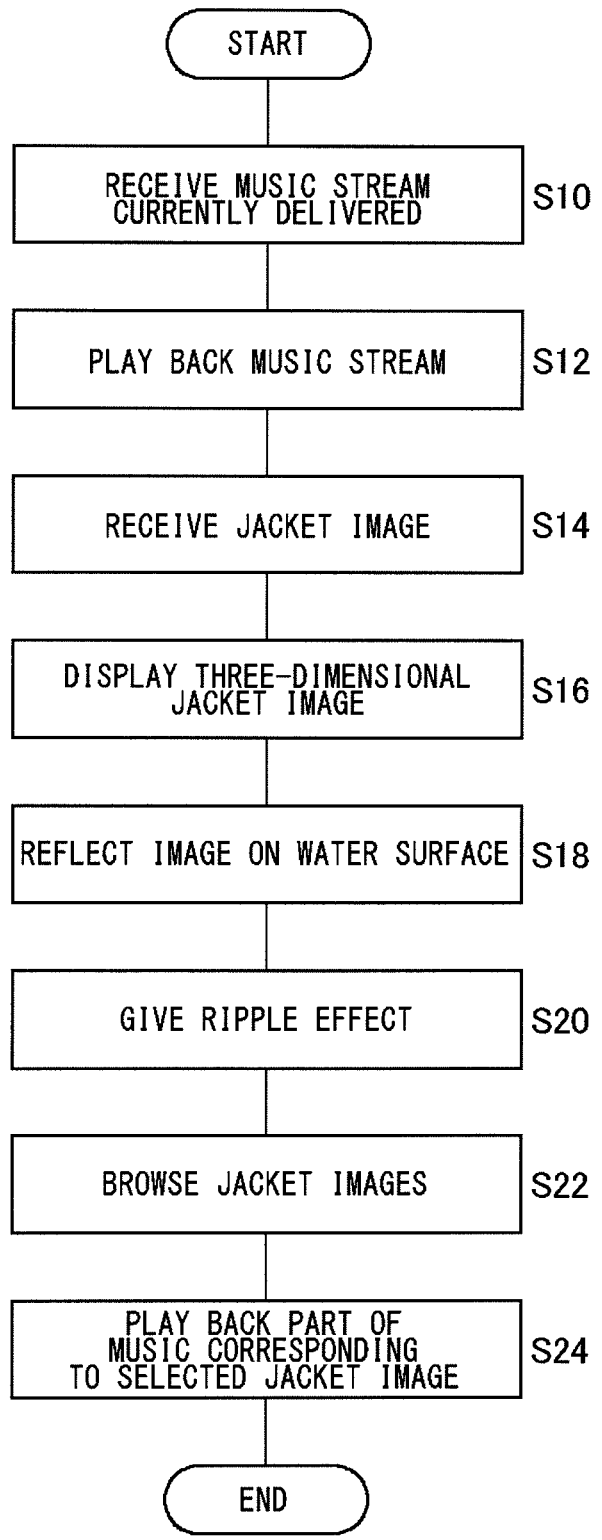
FIG. 5 is a flowchart showing the steps for displaying an image by the client of FIG. 3.

FIG. 5 is a flowchart showing the steps for displaying an image by the client 10 with the aforementioned configuration.

The stream data receiver 20 receives a music stream currently delivered from the streaming server 50 (S10), and the music player 22 plays back the music stream thus received (S12).

The jacket image receiver 12 receives the jacket image corresponding to the music stream currently delivered from the streaming server 50 and stores the image accordingly (S14).

The reflection image generator 26 arranges the jacket images of the music delivered hitherto in the three-dimensional virtual space, blending the images with the background image suitable for the channel received and give the images a three-dimensional appearance (S16). The reflection image generator 26 performs a reflection process in which the background image or the jacket image is reflected in an image of a water surface, in order to create a visual effect that makes the jacket image appear floating on the water surface (S18). By moving the water surface, the Perlin noise generator 28 gives a ripple effect coordinated with, for example, the beat of the music (S20).

The user browses the jacket images of the music delivered in the past and floating on the water surface, via the graphical user interface (S22). When the user selects a particular jacket image while browsing the images, a sample of the music stream corresponding to the jacket image is played back (S24). The use may purchase the music stream thus sampled.

When a new music stream is delivered while browsing the images, control is returned to step S10, whereupon the new music stream is played back and the jacket image of the new music is displayed in a three-dimensional mode.

A description will now be given, with reference to the drawings, of exemplary screens on the display device of the client 100.

Figure 6:
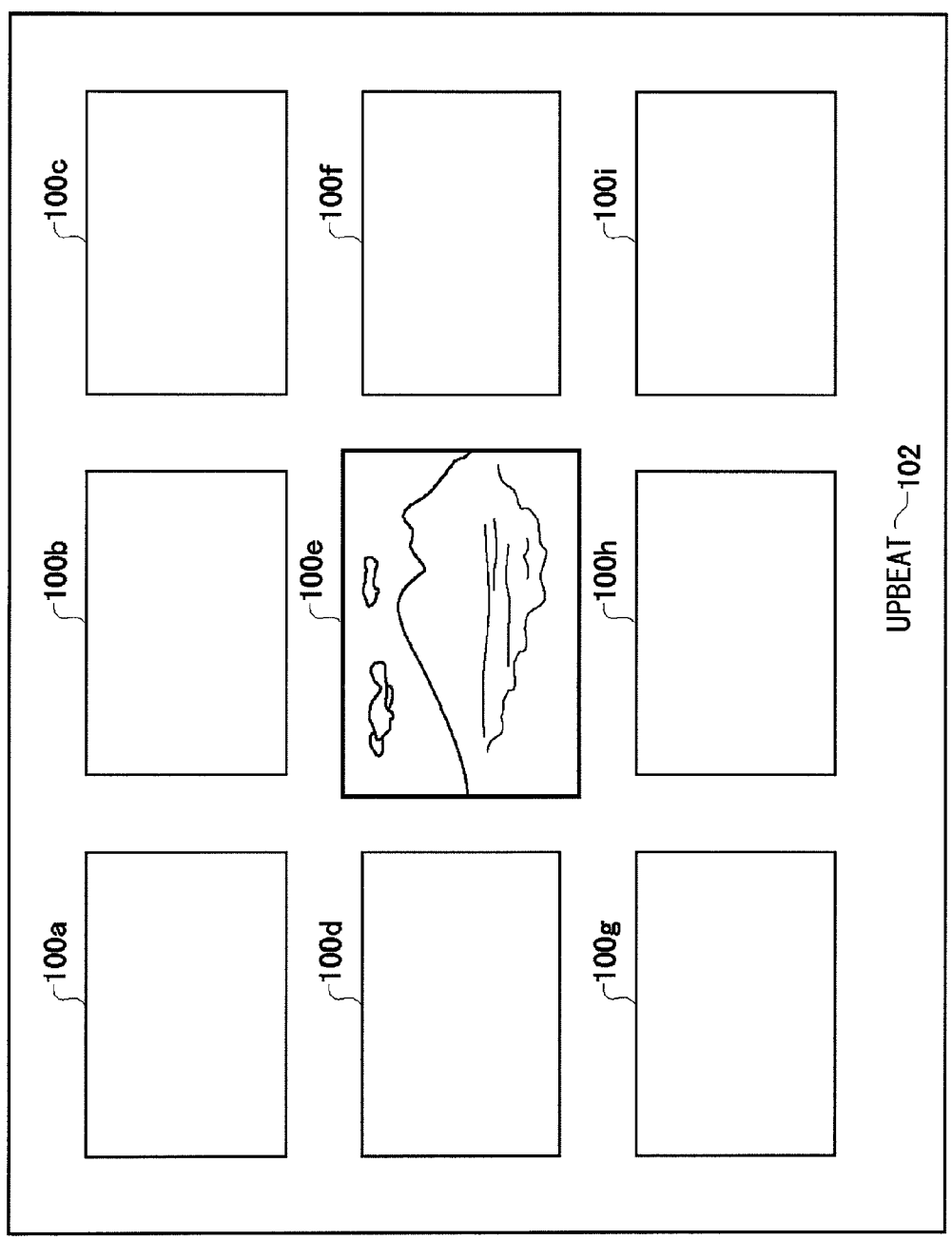
FIG. 6 shows an exemplary screen for selection of a channel of the Internet radio displayed on the monitor of the client.

FIG. 6 shows an exemplary screen for selection a channel of the Internet radio displayed on the television monitor 204 of the client 10. Nine images 100*a*-100*i* correspond to nine channels. In this case, each channel is provided for the mood of music such as upbeat, relax, emotion, etc. The image representing each channel is a reduced version of the background image displayed on the television monitor 204 when that channel is selected or a thumbnail created according to the background image.

The user may manipulate the controller 202 to select one of the nine images 100*a*-100*i* and select a corresponding channel. In this case, the user is selecting the image 100*e* at the center and the image 100*e* is displayed in a slightly larger size than the other images. The mood of the channel corresponding to the image 100*e* selected is displayed using characters toward the bottom of the television monitor 204. In this case, "Upbeat" (reference numeral 102) is displayed. When the user enters a command to finalize the selection of the channel, the monitor will show the screen of FIG. 7A. If more than nine channels are available, the user may scroll the screen by, for example, tilting the analog joystick 218 so as to display images corresponding to new channels.

Figure 7A:
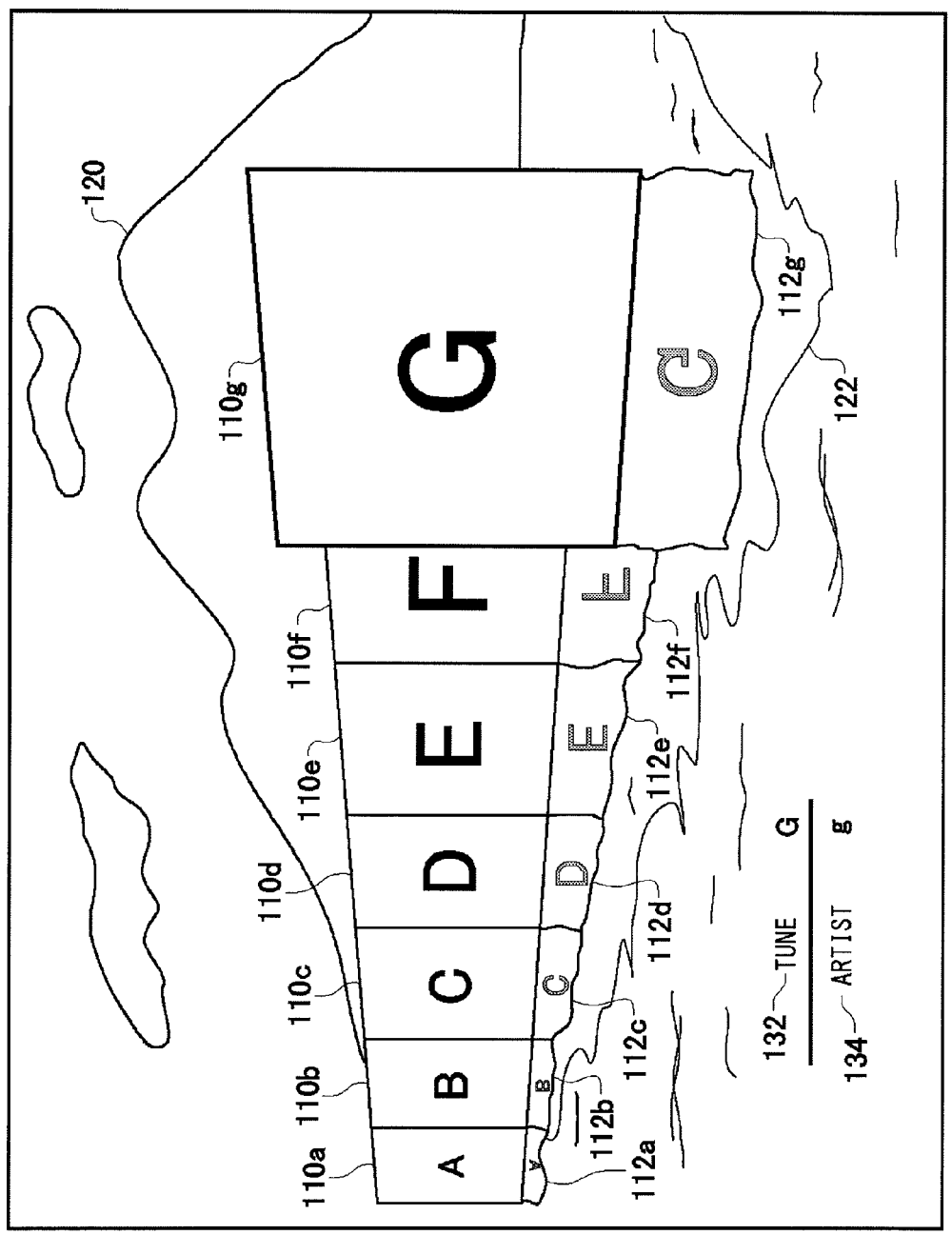
FIG. 7A shows a screen displayed while the music currently delivered is played back.

FIG. 7A shows an example of a normal screen displayed while the music currently delivered is played back in the channel selected by the user. The television monitor 204 displays jacket images 110*a*-110*g* in the three-dimensional virtual space as viewed from the camera position. The jackets of the music delivered in the past are arranged toward the camera position in the order of delivery, irrespective of the channel currently selected. The jacket for the music currently delivered in the selected channel is displayed in front of the other jackets. At the lower left corner of the television monitor 204 are displayed the title of the music tune currently delivered "G" (reference numeral 132) and the name of the artist "g" (reference numeral 134). In this case, the jacket images are schematically denoted by characters A-G. In practice, however, the jacket images of CDs and DVDs are displayed by texture mapping.

Behind the jacket images 110*a*-110*g* is displayed the background image (reference numeral 120) corresponding to the selected channel. The array of the jacket images 110*a*-110*g* appears floating on the water surface. A background image 120 is reflected in the image representing the water surface (reference numeral 122). The images of the jackets are also reflected (reference numerals 112*a*-112*g*). The reflection image is flickered by a Perlin noise. As a result, the water surface appears rippling.

Figure 7B:
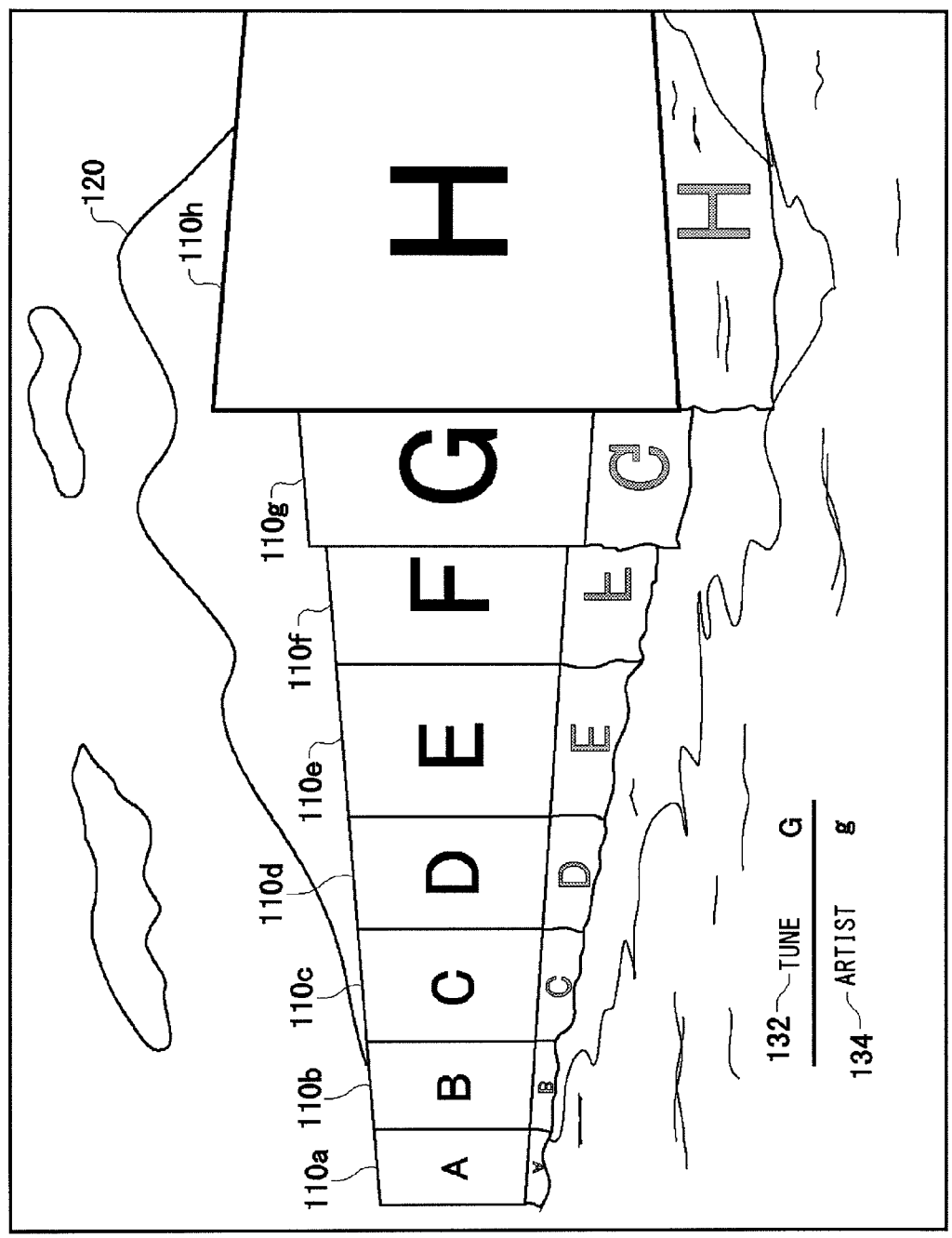
FIG. 7B shows a screen displayed when new music is delivered.
Figure 7C:
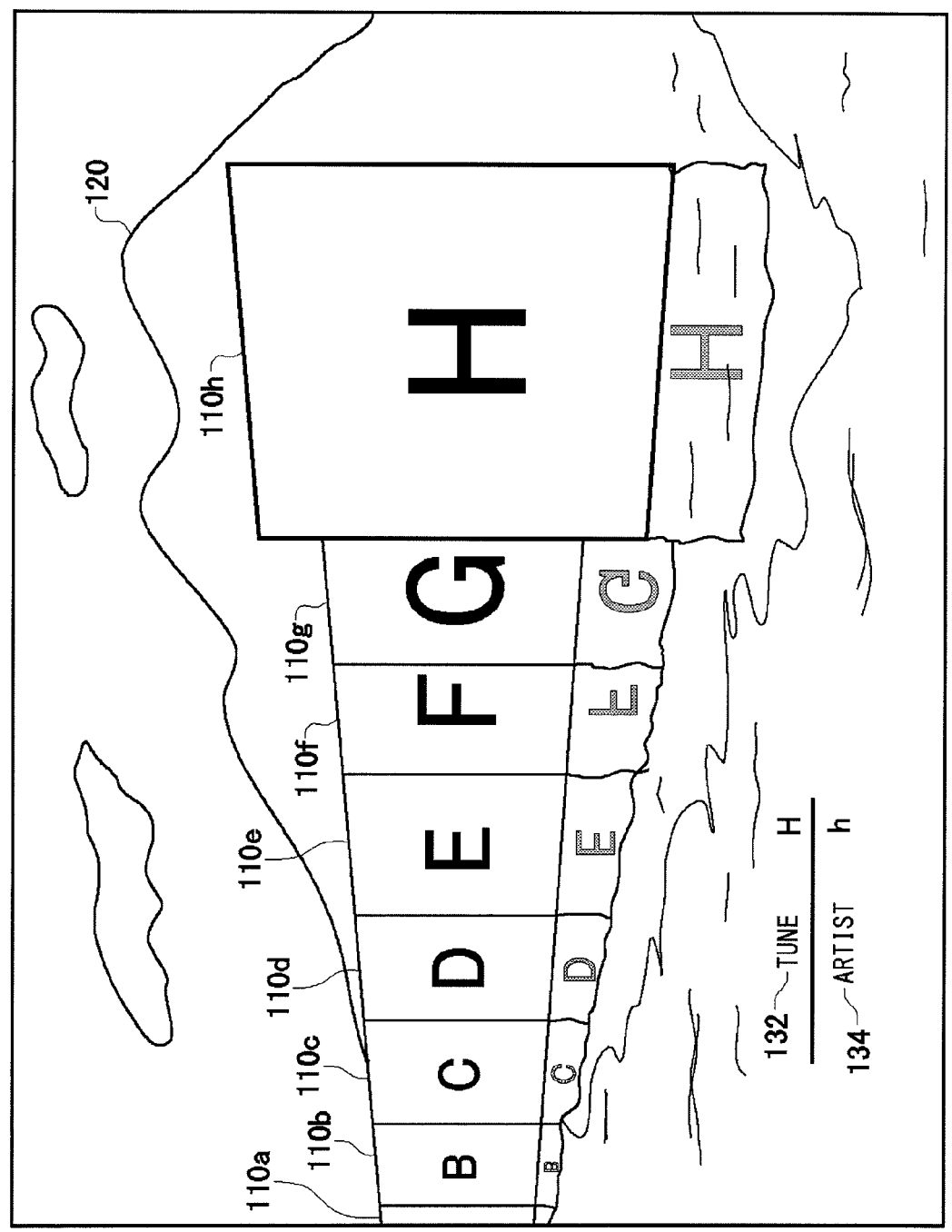
FIG. 7C shows a screen displayed when new music is delivered.

When the playback of the music currently delivered is completed and the new music of the currently selected channel is delivered, the monitor will show the screens of FIGS. 7B and 7C. When the delivery of music G is completed and new music H is received, the jacket image 110*g* of the previously played music G recedes and the jacket image 110*h* of the new music H slides into view in front of the other images from the right of the television monitor 204. Then, as shown in FIG. 7C, the jacket image 110*h* of the new music H is located where jacket for music G was located previously. The jacket images 110*a*-110*g*, including the jacket image of the previous music G, are displayed behind the jacket image 110*h* of the new music H in the order of delivery. At the lower left corner of the television monitor 204 are displayed the title of the new music tune "H" and the name of the artist "h" (reference numerals 132 and 134).

Figure 8A:
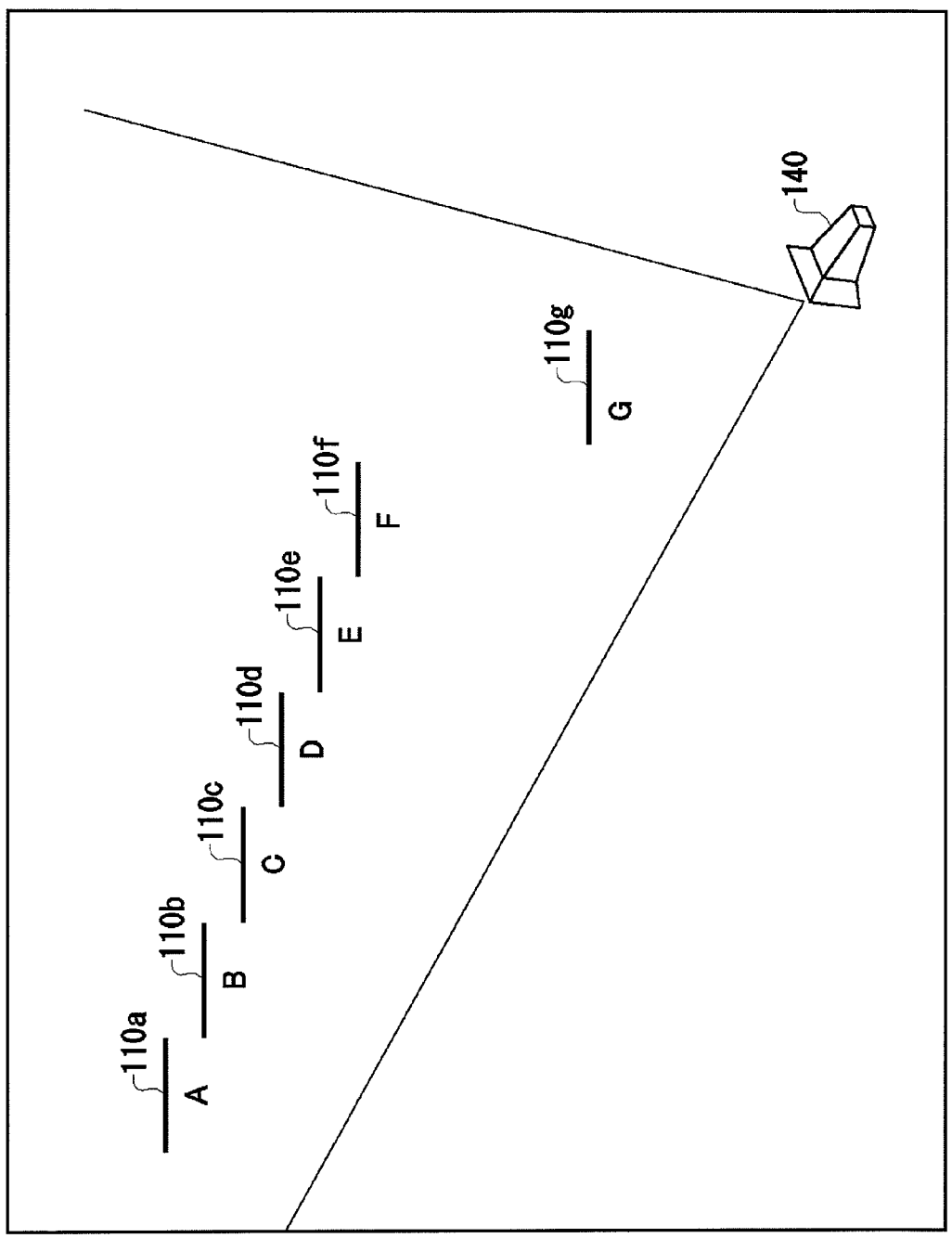
FIG. 8A shows the positions of jacket objects in the three-dimensional space occurring when the screen of FIG. 7A is generated.
Figure 8B:
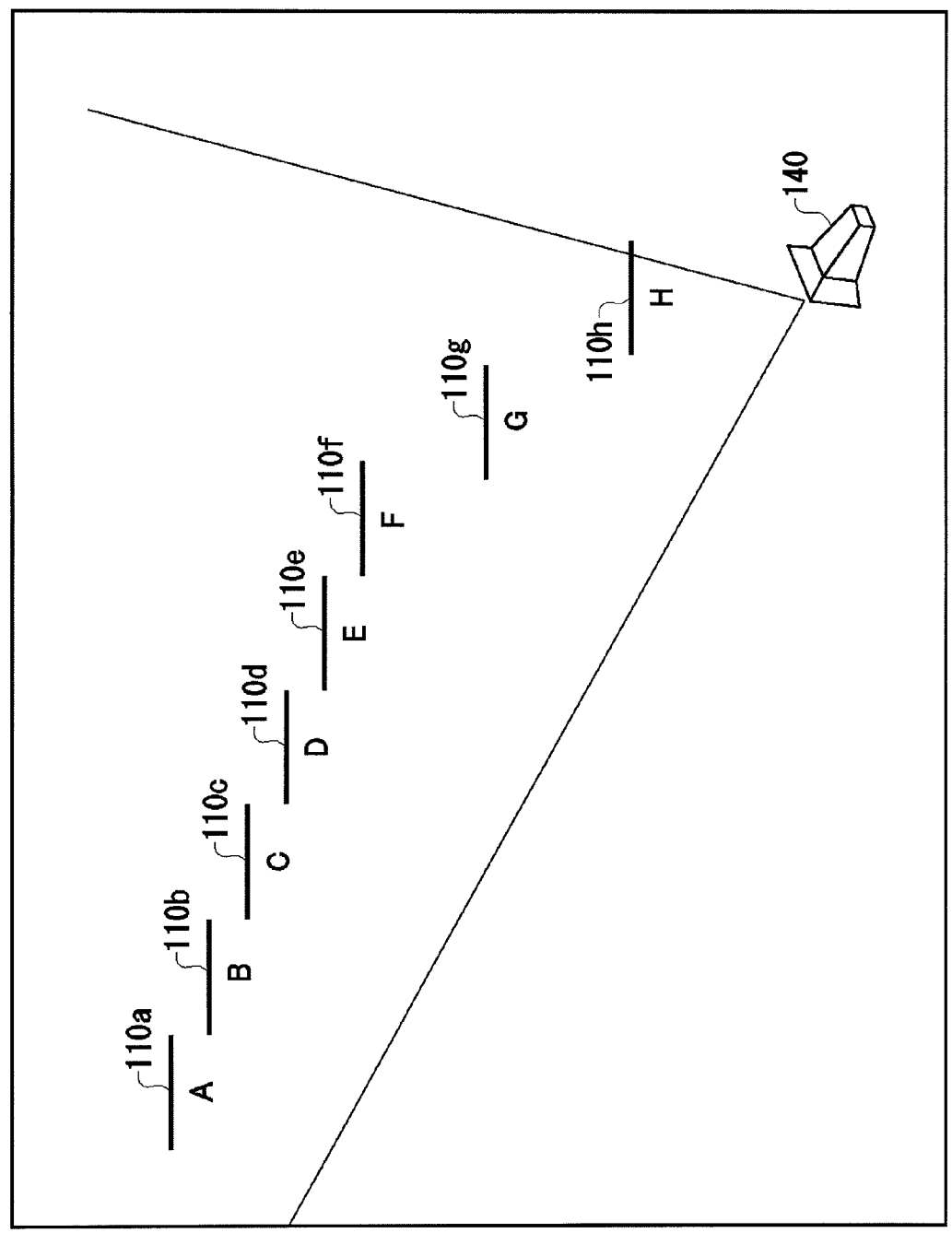
FIG. 8B shows the positions of jacket objects in the three-dimensional space occurring when the screen of FIG. 7B is generated.
Figure 8C:
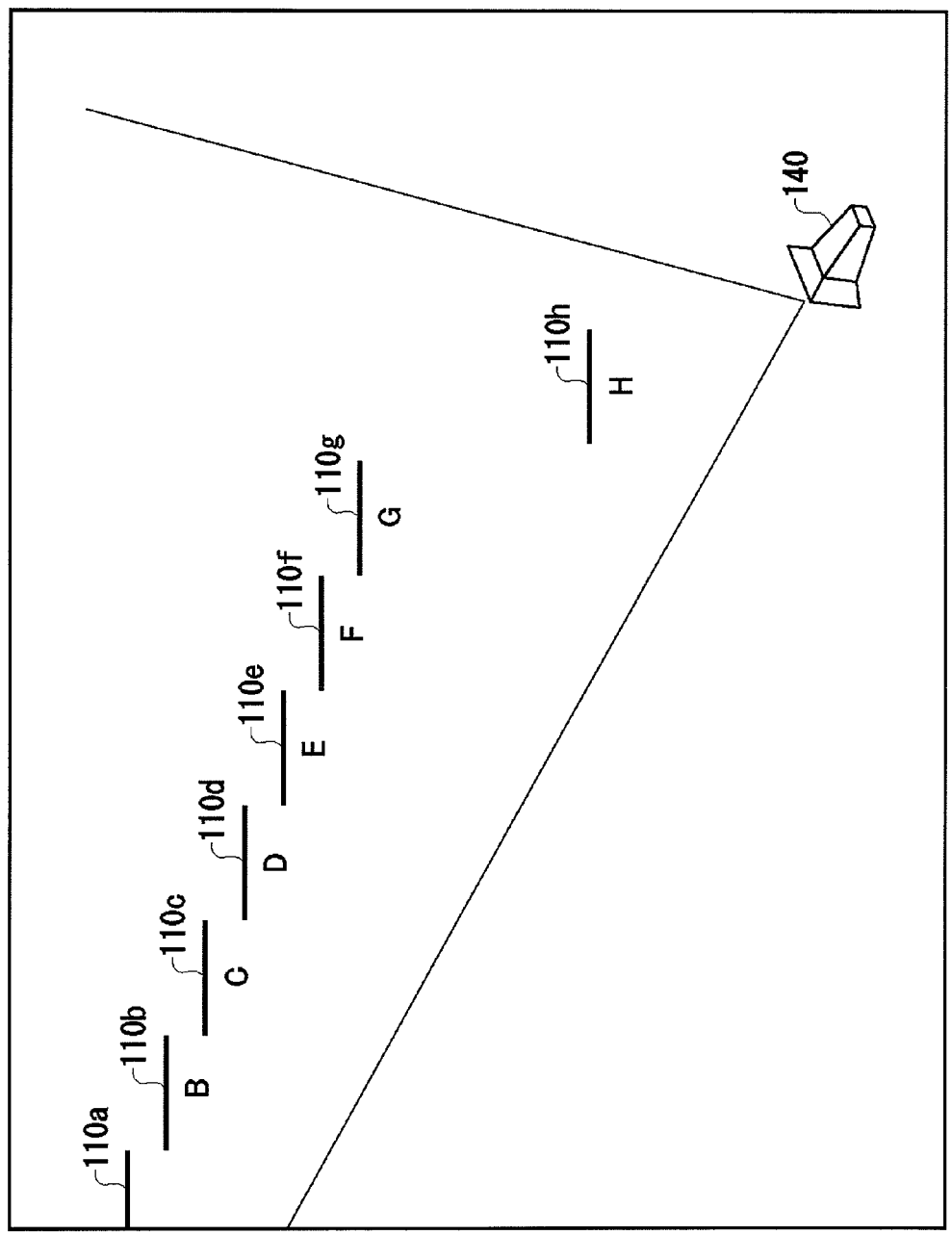
FIG. 8C shows the positions of jacket objects in the three-dimensional space occurring when the screen of FIG. 7C is generated.

FIGS. 8A-8C show the locations of the objects of the jackets in the three-dimensional virtual space occurring when the screens of FIGS. 7A-7C are generated. The three-dimensional virtual space is a space processed by the GPU 302 and virtually set up to compute the images to be displayed on the television monitor 204.

FIG. 8A shows the three-dimensional virtual space when the initial screen of FIG. 7A is generated. The three-dimensional virtual space is viewed from above and the camera is located at a position indicated by reference numeral 140. The objects of the jackets for music A-F delivered in the past are located at positions indicated by reference numerals 110*a*-110*f*. The object of the jacket for music G currently delivered is located closest to the camera (110*g*). The jackets for music A-G delivered hitherto are all visible in the field of view from the camera. The background image is visible behind the jackets.

When a three-dimensional image is generated in the relative positions of FIG. 8A, the jacket for music G currently delivered is displayed in front. The jackets for the past music A-F are displayed such that the older the jacket, the more removed from the camera position, as shown in FIG. 7A. The background image is drawn behind the jackets. Further, the flickering reflection image representing a water surface is drawn below the array of jackets delivered hitherto through a reflection process and a Perlin noise process.

FIG. 8B shows the three-dimensional virtual space occurring when the screen of FIG. 7B is generated. The object of the jacket for the new music H comes into the location indicated by reference numeral 110*h* quite close to the camera. In this process, the jacket for the previous music G recedes to the position indicated by reference numeral 110*g*. When generated is the three-dimensional image as viewed from the camera given the relative positions as described above, the jacket image for the previous music G recedes and the jacket image of the new music H is drawn in a large size in front of the other images, as shown in FIG. 7B.

FIG. 8C shows the three-dimensional virtual space occurring when the screen of FIG. 7C is generated. The object of the jacket for the new music H moves to the location indicated by reference numeral 110*h* where the object of the jacket for the previous music G was located. The objects of the past jackets are sequentially shifted backward such that the object of the jacket for music G moves to the location of the object of the jacket for music F, the object of the jacket for music F moves to the location of the object of the jacket for music E, and so on. Given the relative positions as described above, the three-dimensional image as viewed from the camera is drawn as shown in FIG. 7C.

Figure 9A:
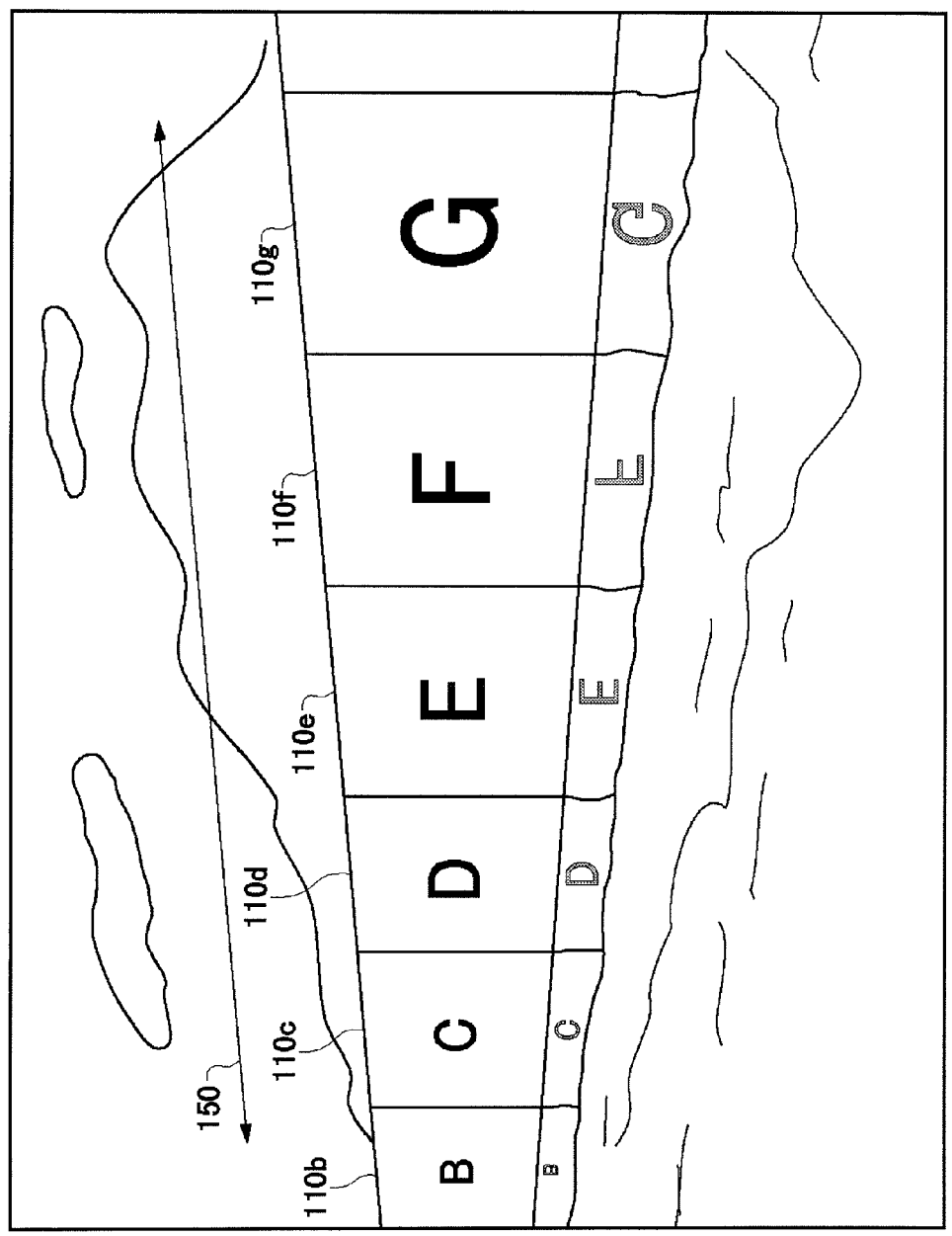
FIG. 9A shows a screen in which to search for a jacket image of the past music.
Figure 9B:
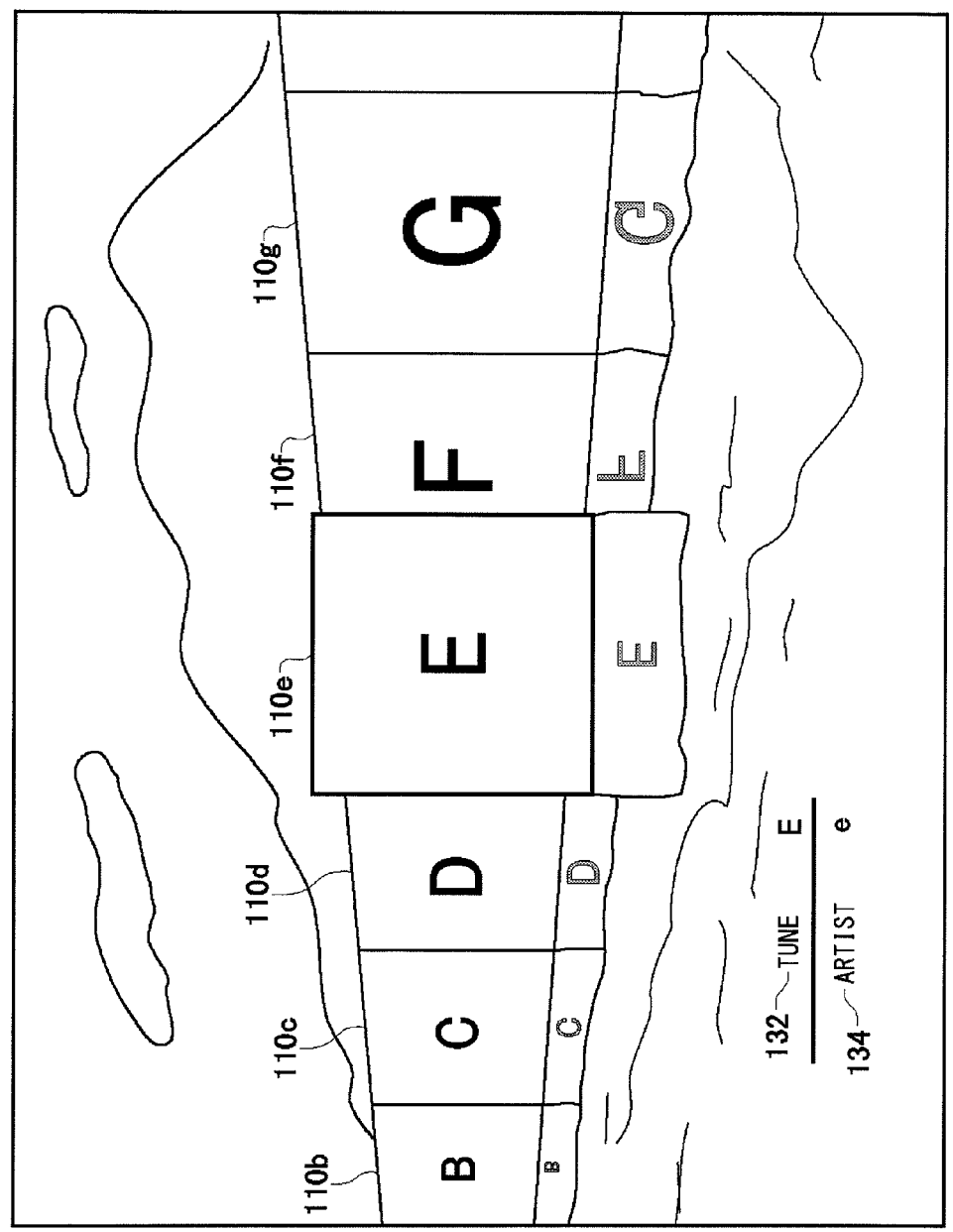
FIG. 9B shows a screen in which to search for a jacket image of the past music.
Figure 9C:
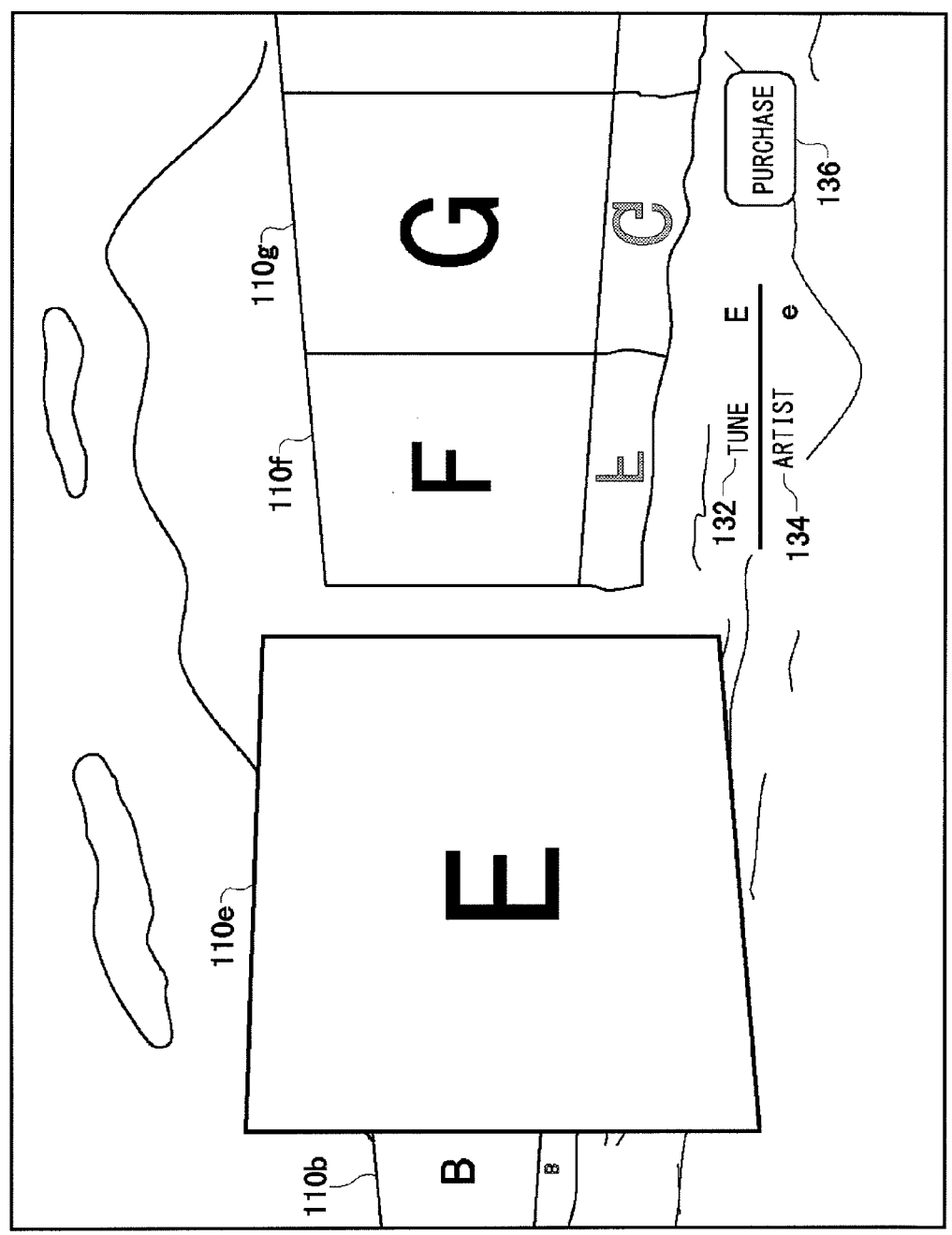
FIG. 9C shows a screen in which to purchase the music identified by the search.

FIGS. 9A-9C are exemplary screens in which to search for a jacket image of the past music. The user can search for a jacket image of the past music by, for example, manipulating the directional key 216 of the controller 202. As shown in FIG. 9A, the television monitor 204 displays jacket images on the water surface without overlapping in an easily viewable fashion. By continuing to press the directional key 216, the array of jacket images is moved on the water surface transversely as indicated by reference numeral 150. The user browses jacket images and discontinues the pressing of the directional key 216 when the target jacket image arrives at the center. While the user is browsing jackets moving on the water surface, a Perlin noise may be induced in the image in accordance with the movement of the jackets so that the water surface appears rippling.

FIG. 9B shows an exemplary screen when the user discontinues the pressing of the directional key 216 when the jacket for music E arrives at the center. The jacket image 110e of music E is drawn in front, and the title of tune "E" and the name of the artist "e" are displayed at the lower left corner of the television monitor 204 (reference numerals 132 and 134). Restriction is imposed on music E such that a sample of the music (e.g., first 30 seconds), but not the entirety thereof, can be enjoyed. The stream data storage 40 of the client 10 stores at least a part of the data for the music delivered in the past. The data may be exploited to play back the past music E, giving the user an opportunity for sampling. When the data for the necessary music delivered in the past is already deleted from the stream data storage 40, the client 10 refers to the history information on the music delivered in the past and acquires the stream data for the necessary music by placing a request with the streaming server 50. The client 10 gives the user an opportunity for sampling by playing back a part of the stream thus acquired.

When the user presses the circular button 224 or the like of the controller 202 in the state of FIG. 9B, selection of music E is confirmed so that the jacket image 110e of music E is drawn in a large size in front of the other images, away from the array of jackets for the past music. As the jacket image 110e of music E moves toward the front, a Perlin noise may be induced so that the water surface ripples below the jacket image. At the lower right corner of the television monitor 204 are displayed the title of tune "E" and the name of the artist "e" (reference numerals 132 and 134). To the right thereof is displayed a button prompting the purchase (reference 136). When the user presses the button prompting the purchase, the client 10 transmits information identifying music E to the music distribution site 60. The client 10 is connected to the music distribution site 60 and the music distribution site 60 is displayed on the television monitor 204. The user can purchase the CD/DVD of music E at the music distribution site 60.

In an ordinary Internet radio system, the user cannot enjoy the music delivered in the past. According to the embodiment, the user is capable of searching for the jacket image of the music delivered in the past and purchasing the music after listening to a sample thereof.

Figure 10A:
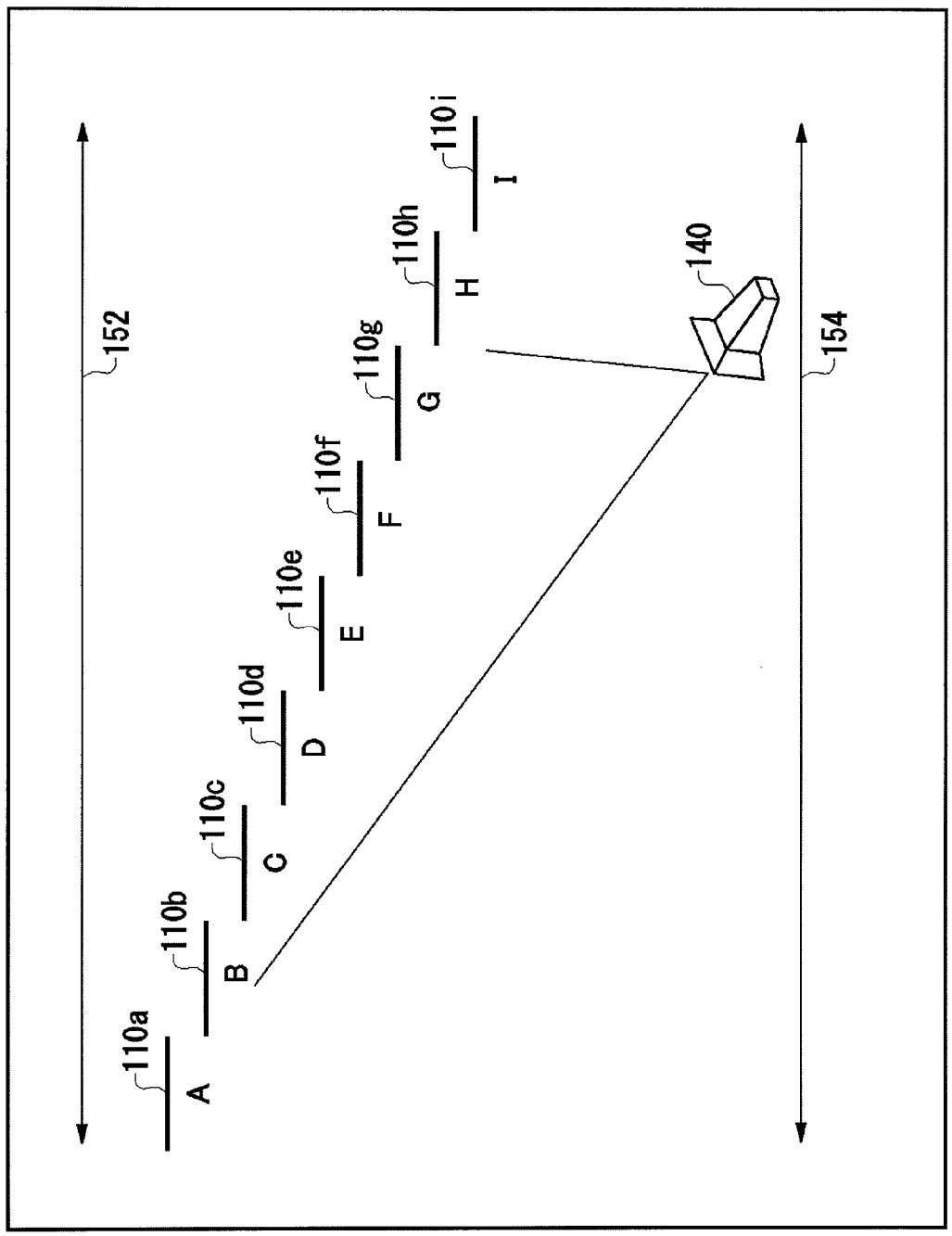
FIG. 10A shows the positions of jacket objects in the three-dimensional virtual space occurring when the screen of FIG. 9A is generated.

FIG. 10A shows the relative positions of three-dimensional virtual space objects occurring when the screen of FIG. 9A in which to search for the jacket for the past music is generated. The camera position is brought closer to the positions of the objects of the past music so that the jacket images displayed do not overlap. While the camera position is fixed, the objects (reference numerals 110a-110i) of the jackets for the past music A-I are moved in the virtual space in the direction indicated by reference numeral 152 in accordance with the user manipulation of the directional keys 216 of the controller 202. This causes the jacket images displayed to be moved in the transverse direction as shown in FIG. 9A. In this process, a Perlin noise may be induced in accordance with the movement of the objects of the jackets to flicker the reflection image, creating a visual effect of waves generated due to the jackets.

Another method of generating a search screen of FIG. 9A is to move the camera in the direction indicated by reference numeral 154 in accordance with the user's manipulation of the directional keys 216 of the controller 202, without moving the objects of the jackets of the past music. This moves the viewpoint in the transverse direction and causes the jacket images displayed to be relatively moved in the transverse direction as shown in FIG. 9A.

Figure 10B:
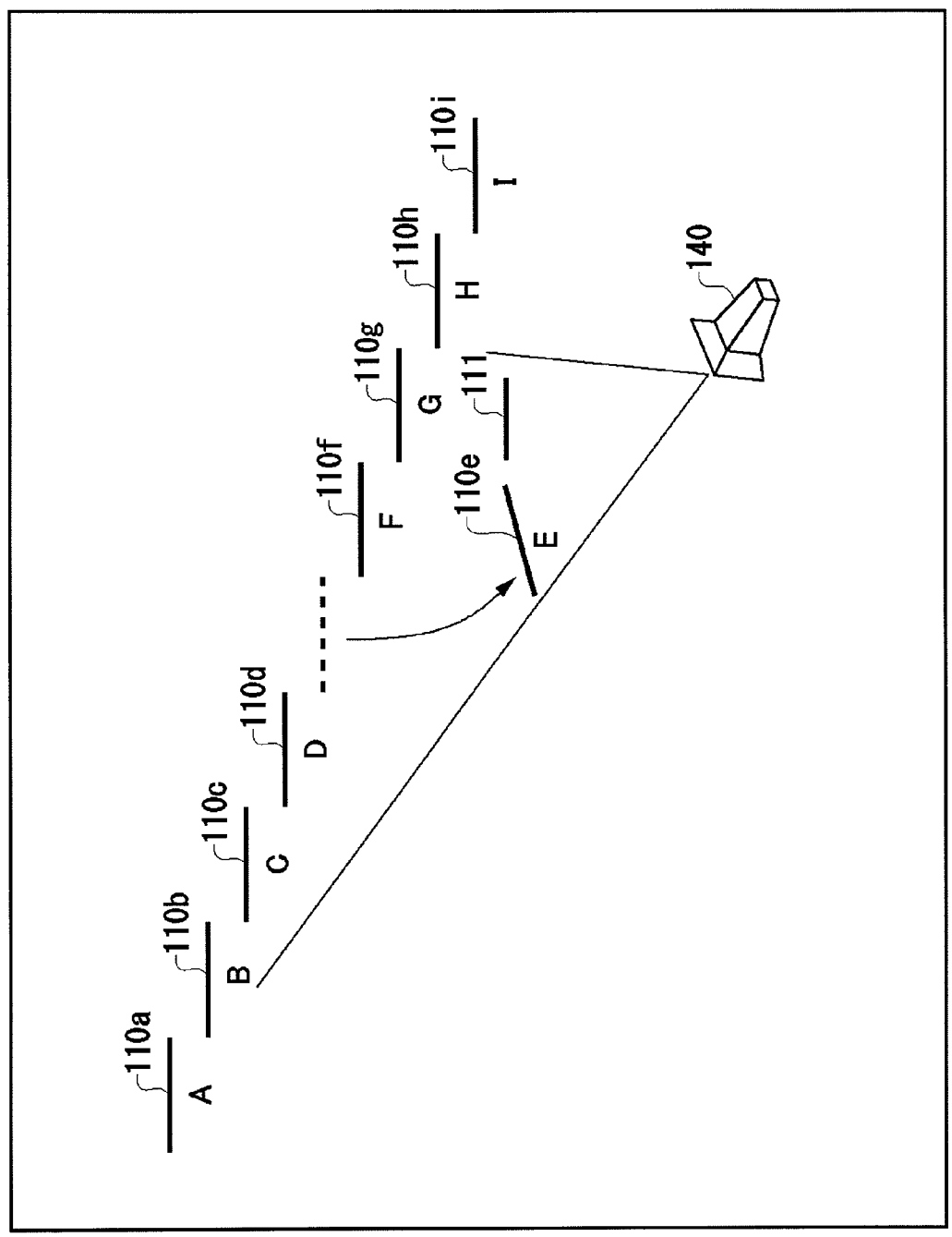
FIG. 10B shows the positions of jacket objects in the three-dimensional virtual space occurring when the screen of FIG. 9C is generated.

FIG. 10B shows the relative positions of objects in the three-dimensional virtual space occurring when the screen of FIG. 9C, in which the jacket for the selected music is displayed in a large size, is generated. The object of the jacket for music E selected is moved close to the camera position as indicated by reference numeral 110e. The title of the music tune E, the name of the artist, and the texture object of the purchase button 111 are displayed next to the object of the jacket for music E. The three-dimensional image drawn while the relative positions as described above are maintained is shown in FIG. 9C.

Described above is how music sequentially delivered is played back in the Internet radio system according to the embodiment, the configuration related to image processing for displaying the jackets for the music in the three-dimensional virtual space, and the user interface for browsing the jackets. The client 10 is also provided with an interface of a media player for playing back music data purchased at the music distribution site 60 and stored in a local storage such as the hard disk drive 334. The media player is capable of playing back not only a music file purchased at the music distribution site 60 but also the music data stored in a local storage such as the hard disk drive 334. When a jacket image is embedded in the music file, the media player can use the embedded jacket image as the jacket image of the music file. Hereinafter, a description is given of the interface of the media player.

Figure 11:
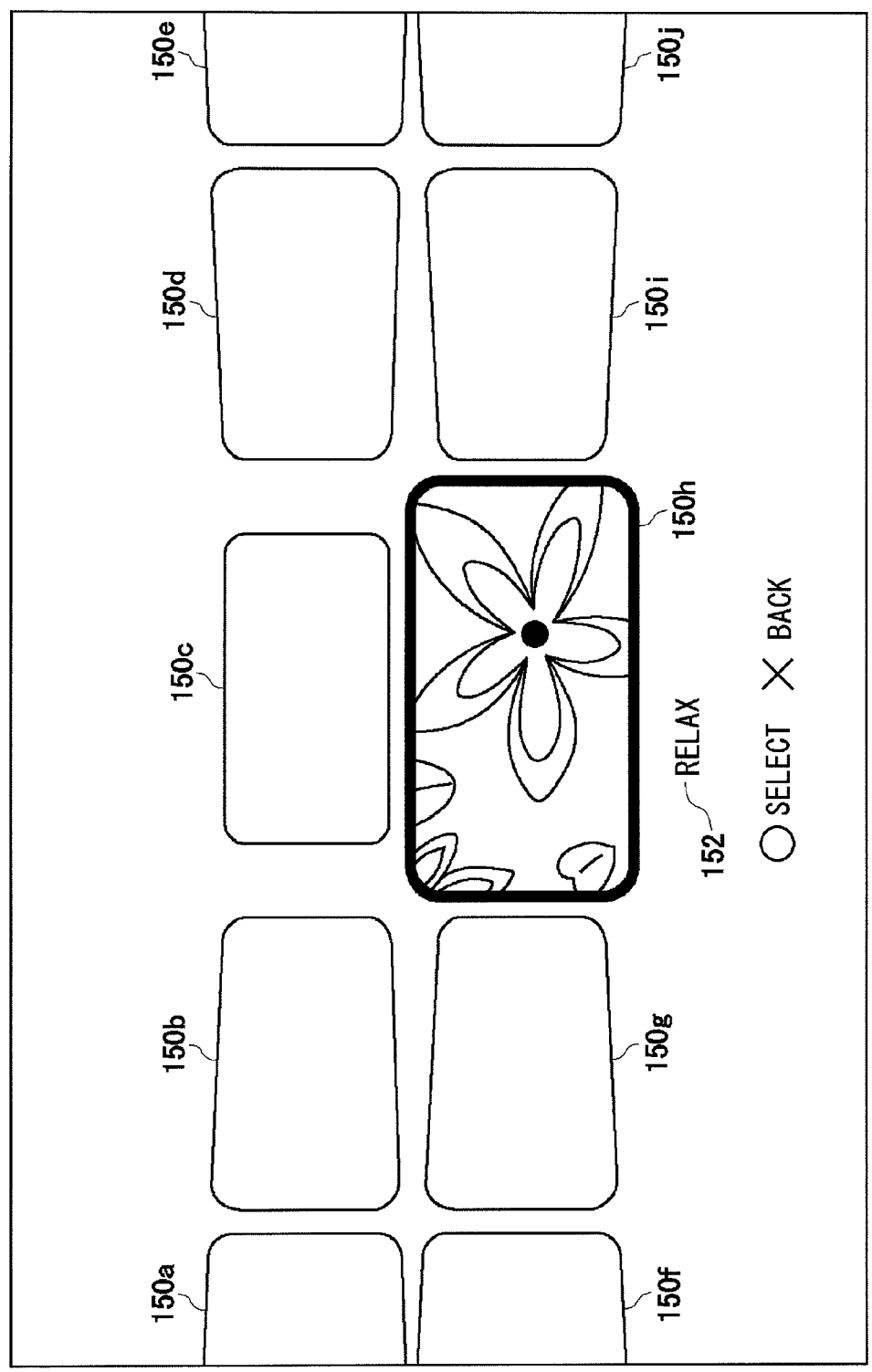
FIG. 11 shows an example of a channel selection screen of the media player for playing back music in the client of FIG. 3.

FIG. 11 shows an example of a screen of the media player displayed on the television monitor 204 and used to select a channel. Ten images 150a-150j correspond to ten channels. In this case, the channels are provided for a plurality of types of mood of music, such as upbeat, relax, emotion, etc., defined by analyzing the music. The image representing each channel is a reduced version of the background image displayed on the television monitor 204 when that channel is selected or a thumbnail created according to the background image.

The user may manipulate the controller 202 to select one of the ten images 150a-150j and select a corresponding channel. If ten or more channels are available (e.g., 12 channels), the user may scroll the screen by manipulating the controller 202 so as to select an image corresponding to another channel not shown. In this case, the user is selecting the image 150h at the lower center and the image 150h is displayed in a slightly larger size than the other images. The mood of the channel corresponding to the image 150h selected is displayed using characters toward the bottom of the television monitor 204. In this case, "Relax" (reference numeral 152) is displayed. When the user enters a command to finalize the selection of the channel, the monitor will show the screen of FIG. 12A.

In the channel selection screen, the jacket image of the album played back immediately before the media player was closed last time may be displayed semi-transparently over the background (not shown).

Figure 12A:
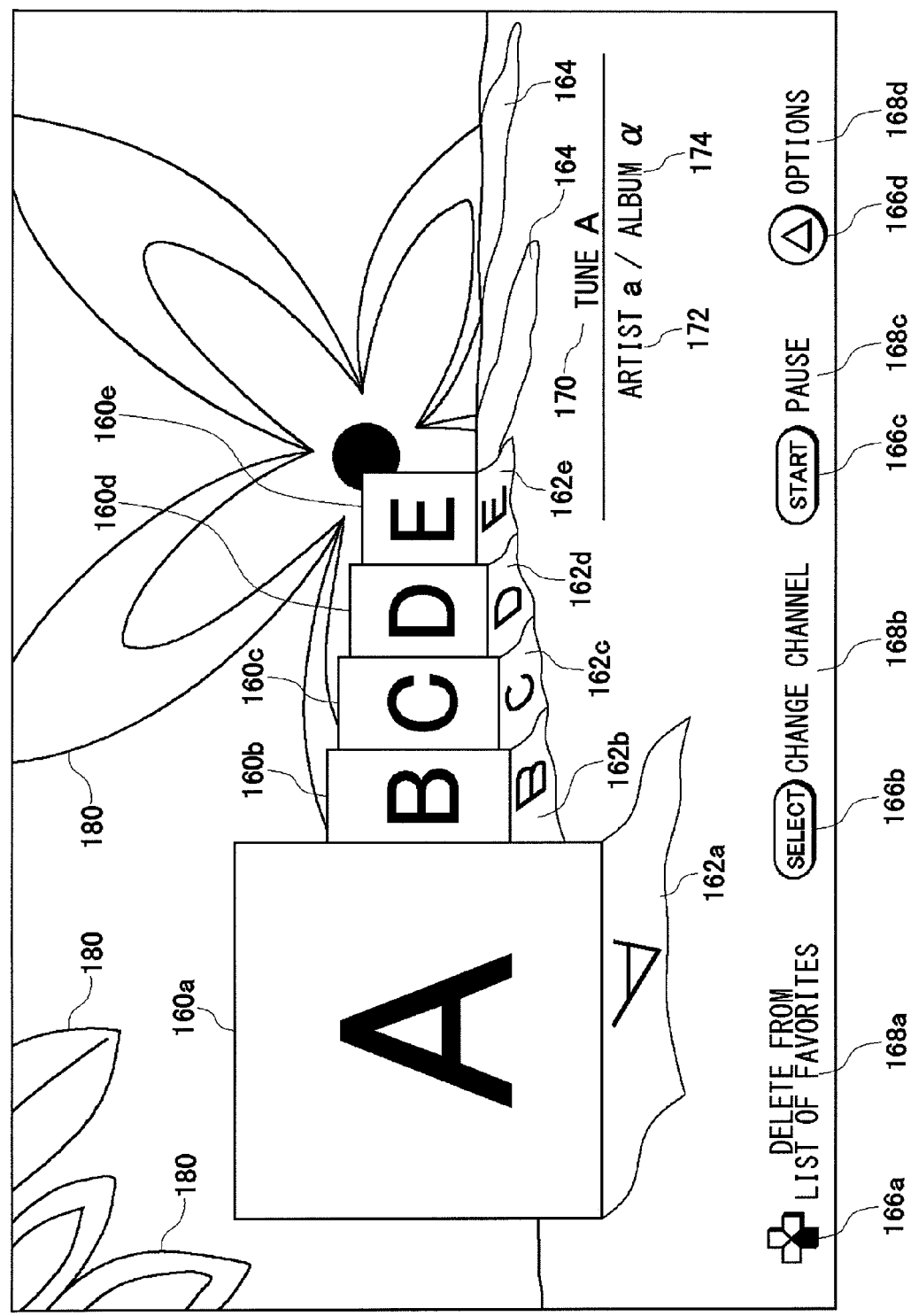
FIG. 12A shows a screen displayed while the media player is playing music.

FIG. 12A shows an example of a normal screen displayed while the music stored in a local storage such as the hard disk drive 334 is played back in the channel selected by the user. The television monitor 204 displays five jacket images 160a-160e in the three-dimensional virtual space as viewed from the virtual camera position. Jacket images (e.g., images embedded in the music data) grouped into the currently selected channel are arranged randomly. The jacket for the music currently played is displayed in front of the other jackets. At the lower right corner of the television monitor 204 are displayed the title of the music tune "A" currently delivered (reference numeral 170) and the name of the artist "a" (reference numeral 174). In this case, the jacket images are schematically denoted by characters A-G. In practice, however, the jacket images of CDs and DVDs are displayed by texture mapping. Instead of randomly, the jacket images may be arranged in the order of purchase, in the order of Japanese syllabary, in the order of preference, etc.

Behind the jacket images 160a-160e is displayed the background image (reference numeral 180) corresponding to the selected channel. The array of the jacket images 160a-160e appears floating on the water surface. A background image 160 is reflected in the image representing the water surface (reference numeral 164). The images of the jackets are also reflected (reference numerals 162a-162e). The reflection image is flickered by a Perlin noise. As a result, the water surface appears rippling.

The icons representing the directional keys 216 (reference numeral 166a), the select button 240 (reference numeral 166b), the start button 238 (reference numeral 166c), and the triangular button 230 (reference numeral 266d) of the controller 202 are displayed toward the bottom of the television monitor 204. By pressing the button of the controller 202 corresponding to the icon, the music may be deleted from the list of favorites, the channel selection may be changed, the playback may be paused, or options may be displayed. These operations are presented for selection adjacent to the respective icons, using characters such as "Delete from the list of favorites" (reference numeral 168a), "Change channel" (reference numeral 168b), "Pause" (reference numeral 168c), "Options" (reference numeral 168d).

Figure 12B:
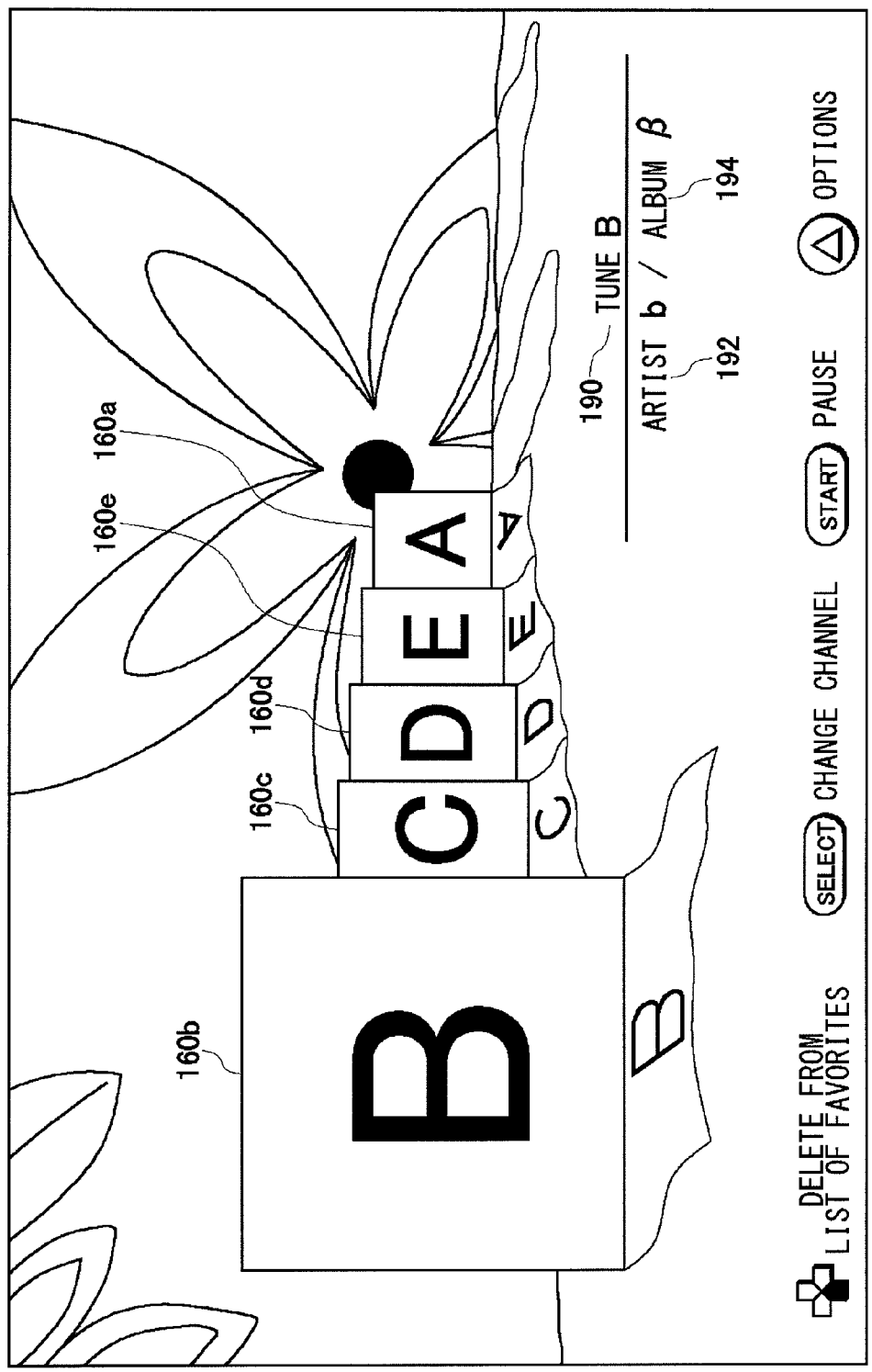
FIG. 12B shows a screen displayed while the media player is playing music.

When the playback of music A currently played back ends, the monitor then shows the screen of FIG. 12B. As shown in FIG. 12B, the jacket image 160a of music A recedes and the jacket image 160b of music B is shifted forward and displayed in a large size. Then, as shown in FIG. 12B, the jacket image 160b of the new music B is located where jacket for music A was located previously. At the lower left corner of the television monitor 204 are displayed the title of the new music tune "B", the name of the artist "b", and the title of album "β" (reference numerals 190, 192, and 144).

In the interface for the Internet radio described above, the jacket image of the music that has been played is displayed at a receded position immediately behind the jacket image of the music currently played back (reference numeral 110g in FIG. 7C). In contrast, in the interface of the media player, the jacket image of the music that has been played is located at the end of the array of jacket mages categorized into the currently selected channel (160a in FIG. 12B).

It will be assumed, for example, that five jacket images "A, B, C, D, and E" are categorized into the currently selected channel and are arranged in the order "A, B, C, D, and E". When the playback of music A ends, the jacket arrangement will be "B, C, D, E, and A". When the playback of music B ends, the jacket arrangement will be "C, D, E, A, and B". Thereafter, the jacket arrangement will be cyclically changed. This avoids a problem where jacket images for the music do not remain displayed on the interface, even if the number of jacket images categorized into the currently selected channel is small.

A description will now be given of a portable electronic device 400 according to another embodiment of the present invention.

Figure 13:
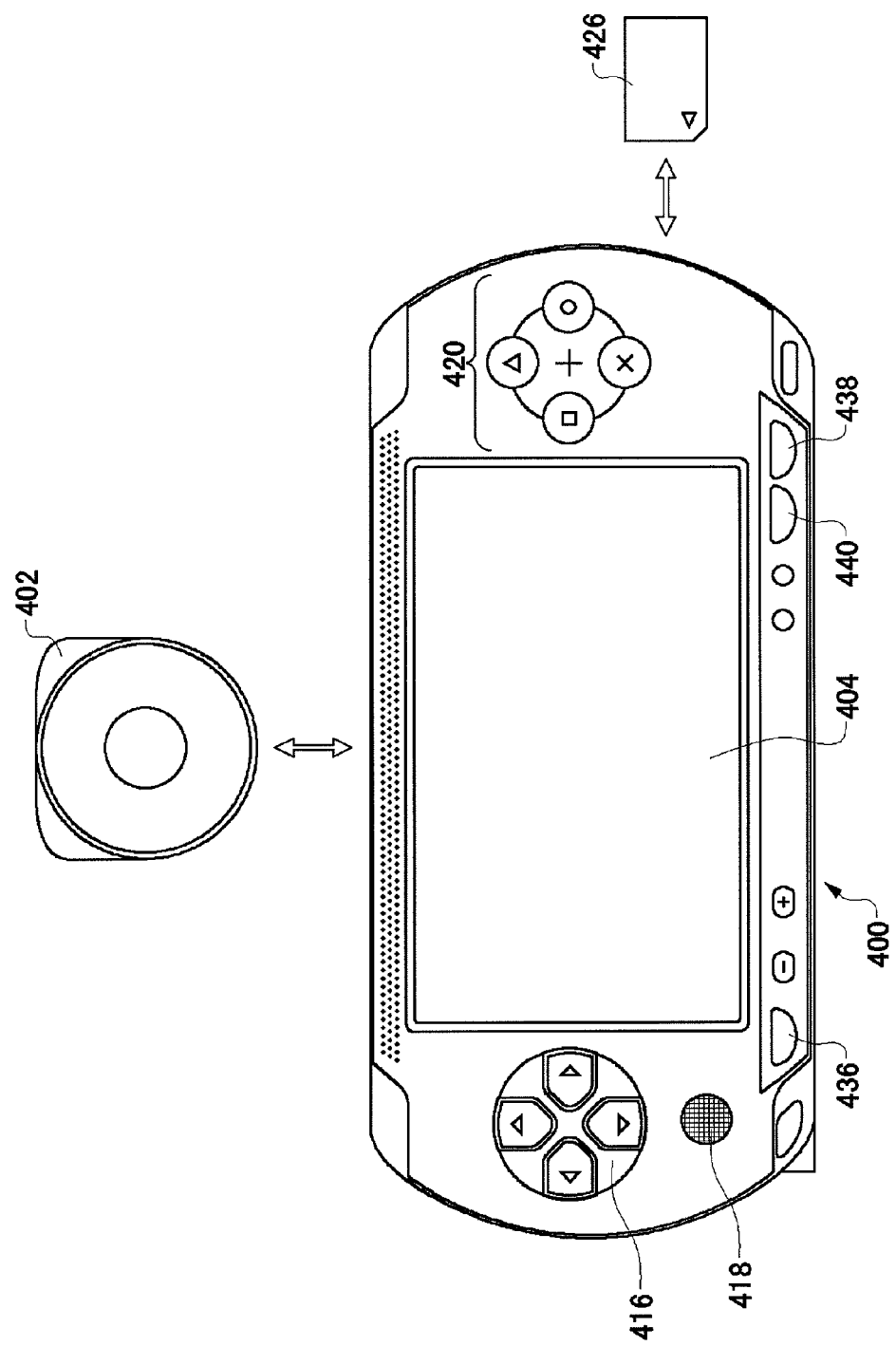
FIG. 13 is a schematic diagram of the structure of a portable electronic device according to the embodiment.

FIG. 13 shows the appearance of the portable electronic device 400. The portable electronic device 400 is capable of playing back digital contents such as moving images, still images and music. In addition, the device 400 is capable of running contents like a game program. Each content is primarily read from an external storage medium detachable from the portable electronic device 400. The external recording medium in this embodiment is a small optical disk 402 and a memory card 426. The small optical disk 402 and the memory card 426 are mounted on a drive (not shown) provided in the portable electronic device 400. The small optical disk 402 is not only capable of storing music data and still image data but also storing moving image data such as a movie characterized by a relatively large data size. The memory card 426 is a small memory card which can also be detachably installed in a digital camera or a cell phone. The memory card 426 primarily stores still image data, moving image data, audio data, etc., prepared by the user by using another device or data exchanged between devices.

The portable electronic device 400 is provided with a liquid crystal display 404 and keys including directional buttons 416, an analog stick 418, buttons 420, and the like. The user holds the right and left ends of the portable electronic device 400 with both hands. The directional buttons 416 or the analog stick 418 is accessed primarily by the left thumb to specify up/down/left/right movement. The buttons 420 are accessed primarily by the right thumb to provide various instructions. Unlike the directional buttons 416 and the buttons 420, a home button 436 is provided at a position not likely to be pressed by any finger when the left and right ends of the portable electronic device 400 are held with both hands, thereby preventing false operations. The liquid crystal display 404 displays an on-screen menu with a graphical user interface as well as displaying a content while it is being played back. The portable electronic device 400 is also provided with a USB port and wireless LAN functions, for data exchange with other devices using the ports and the communication functions. The device 400 is also provided with an infrared port for data exchange with other devices using infrared communication.

The portable electronic device 400 is further provided with a select button 440, a start button 438, etc. The start button 438 is used, e.g., when the user instructs the device 400 to start a game, start displaying an e-mail screen, or play a movie or music, or pause the game or the playback of the movie or music. The select button 440 is used, e.g., when the user instructs the device 400 to, for example, select in the menu displayed on the liquid crystal display 404.

Figure 14:
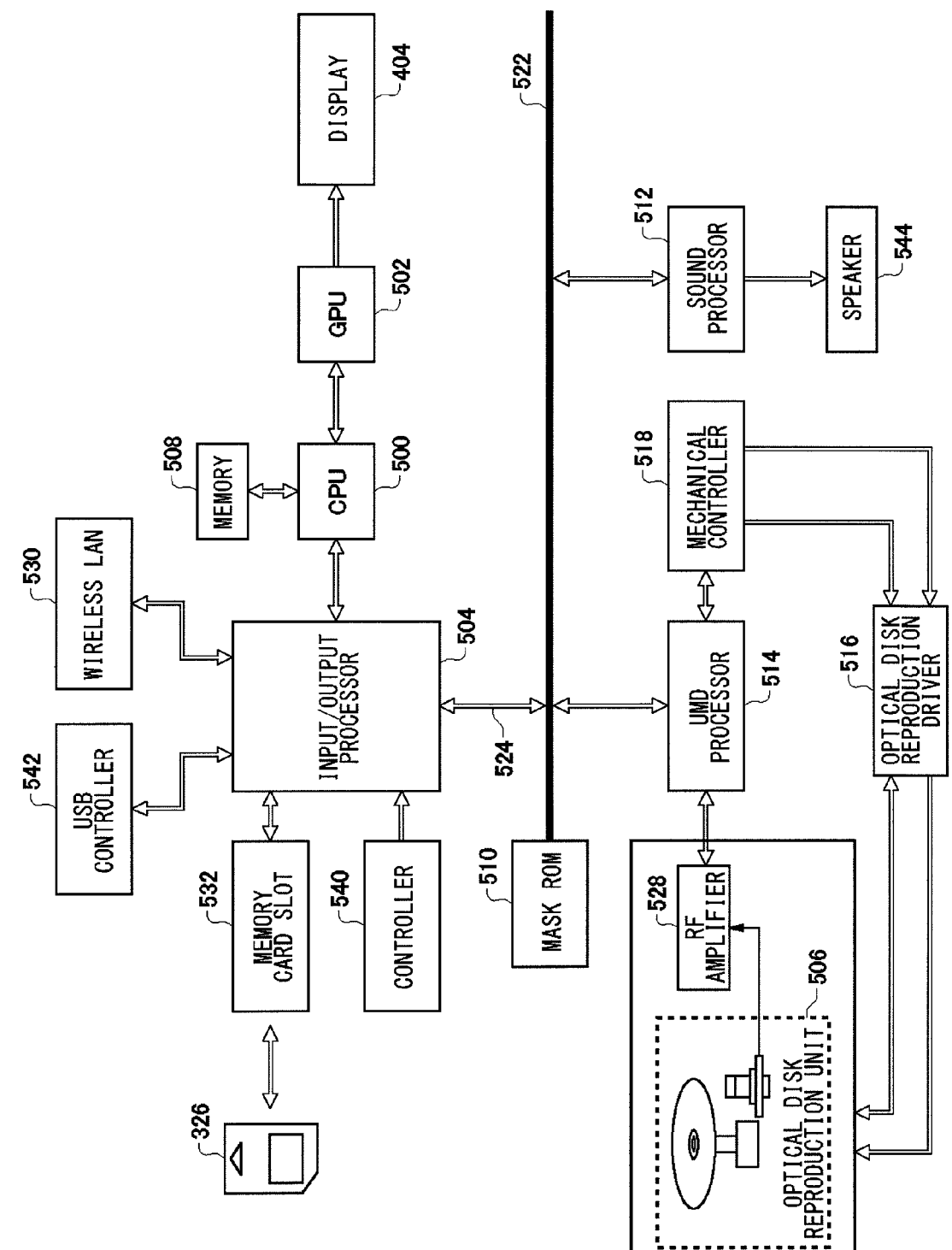
FIG. 14 is a block diagram showing the schematic configuration of the internal circuit of the portable electronic device.

FIG. 14 shows the internal circuit configuration of the portable electronic device 400.

The portable electronic device 400 includes, as its principal components, a main CPU 500, a GPU 502, an input/output processor 504, an optical disk reproduction unit 506, a main memory 508, a MASK ROM 510, and a sound processor 512. The main CPU 500 performs signal processing and control of various internal components based on various programs such as application programs for games, e-mails, and a Web browser. The GPU 502 performs image processing. The input/output processor 504 performs interfacing or processing to maintain downward compatibility between external devices and the internal components of the device. The optical disk reproduction unit 506 reproduces an optical disk, such as a UMD having an application program or multimedia data recorded therein. The main memory 508 serves as a work area for the main CPU 500 and a buffer for temporarily storing data read out from an optical disk. The MASK ROM 510 stores therein operating system programs to be executed mainly by the main CPU 500 and the input/output processor 504. The sound processor 512 performs audio signal processing.

The portable electronic device 400 is further provided with a UMD processor 514, an optical disk reproduction driver 516, and a mechanical controller 518. The UMD processor 514 performs, e.g., error correction processing (e.g., CIRC), expansion decoding processing, and so on, to a disk reproduction signal read out from a UMD by the optical disk reproduction unit 506 and then amplified by an RF amplifier 528, thereby reproducing (reconstructing) data recorded on the UMD. The optical disk reproduction driver 516 and the mechanical controller 518 perform rotation control of a spindle motor of the optical disk reproduction unit 506, focus/tracking control of an optical pickup, loading control of a disk tray, etc.

These components are connected with each other mainly through bus lines 522, 524, etc. The main CPU 500 and the GPU 502 are connected with each other through a dedicated bus line. Additionally, the main CPU 500 and the input/output processor 504 are connected with each other through an SBUS. The input/output processor 504, the UMD processor 514, the MASK ROM 510, and the sound processor 512 are connected with each other through the SSBUS.

The main CPU 500 executes an operating system program for the main CPU stored in the MASK ROM 510 to control the entire operation of the portable electronic device 400. Furthermore, the main CPU 500 executes various application programs read from an optical disk like a UMD and loaded into the main memory 508, or programs downloaded via wireless LAN 530, so as to control operations for playing a game, preparing or editing an e-mail, reading a Web page, etc.

The input/output processor 504 executes an operating system program for the input/output processor stored in the MASK ROM 510 to control signals from the controller 504 based on operations by the operator, and data input/output between the device 400 and a memory card 326 storing therein a setting of a game, the contents and addresses of e-mails, the URLs of Web sites, or the like. The processor 504 also controls data input/output at a USB connection terminal 542, the wireless LAN 530, or the like. The controller 540 is a generic term encompassing keys such as the directional buttons 416, the analog stick 418, and the buttons 420, that the user uses to control the portable electronic device 400.

The GPU 502 has a function of a geometry transfer engine for coordinate conversion, and a function of a rendering processor. The GPU 502 draws an image according to rendering instructions from the main CPU 500 and then stores the drawn image into a non-illustrated frame buffer. More specifically, in the case that various application programs stored on an optical disk use three-dimensional (3D) graphics such as those of a game, the GPU 502 calculates, in a geometry operation process, the coordinates of polygons to constitute a three-dimensional object. Further, the GPU 502 performs, in a rendering process, various calculations to make an image that may be obtained by shooting the three-dimensional object by a virtual camera, i.e., the GPU 502 executes a perspective conversion (calculation of the coordinate values of the vertexes of each polygon consti- tuting the three-dimensional object when the vertexes are projected on a virtual camera screen, and so on). The GPU 302 finally writes the obtained image data into the frame buffer. The GPU 502 then outputs a video signal corresponding to the thus made image.

The sound processor 512 has an ADPCM (Adaptive Differential Pulse Code Modulation) decoding function, an audio signal reproducing function, a signal modulating function, etc. The ADPCM decoding function is a function of reading out waveform data from a non-illustrated sound buffer incorporated in or externally connected with the sound processor 512, to reproduce and output an audio signal for, e.g., sound effects. The signal modulating function also serves as a sampling sound source for producing an audio signal for, e.g., music sounds, sound effects or the like from waveform data stored in the sound buffer.

For example, when portable electronic device 400 constructed as described above is turned on, the operating system programs for the main CPU 500 and the input/output processor 504 are read out from the MASK ROM 510. These read-out operating system programs are executed by the main CPU 500 and the input/output processor 504, respectively. By executing the operating system program, the main CPU 500 controls each component of the portable electronic device 400. On the other hand, the input/output processor 504 controls signal input/output between the controller 540, the memory card 526, or the like, and the device 400. Also, by executing the operating system program, the main CPU 500 performs initialization such as operation check and so on. The main CPU 500 then controls the optical disk reproduction unit 506 to read out an application program for a game or the like from an optical disk and to load the application program in the main memory 508. The main CPU 500 executes the program. By executing the application program, the main CPU 500 controls the GPU 502 and the sound processor 512 following the operator's instructions received through the controller 540 and the input/output processor 504 to control image display and production of a sound effect, a music sound, or the like.

Also, in the case that the game device reproduces, e.g., a movie recorded on an optical disk, the main CPU 500 controls the GPU 502 and the sound processor 512 following the operator's instructions (commands) received through the controller 540 and the input/output processor 504 to control image display and production of a sound effect, a music sound, or the like, of the movie being reproduced from the optical disk. The result of processing by the GPU 502 is displayed on the liquid crystal display 404. The sound effect, music, etc. generated by the sound processor 512 are output from a speaker 544.

The client 10 of FIG. 4 is functionally implemented in the game device 200 of the aforementioned game system. The functional blocks of the Internet radio system are implemented by modules of the application program loaded into the main memory 308 and mainly executed by the main CPU 300 and the GPU 302 of the game device 200.

The stream data receiver 20 receives data for a music stream currently delivered from the streaming server 50 via the wireless LAN 530 and stores the data in a stream data storage 40. The stream data storage 40 is implemented as, for example, a part of the memory card 426.

The stream data storage 40 stores the data for music streams delivered in the past while the storage capacity of the memory card 426 permits. When the data exceeds the capacity permitted by the memory card 426, older data are sequentially deleted.

The music player 22 reads the stream data from the stream data storage 40 and reproduces the sound by decoding the data in the sound processor 512.

The jacket image receiver 12 receives a jacket image corresponding to the music stream currently delivered from the stream server 50 and stores the image in a jacket image storage 36, which is a part of the memory card 426.

The client 10 not only displays a jacket image of the music currently delivered but also displays a jacket image of the music delivered in the past on the liquid crystal display 404. Jacket images for the music delivered hitherto are displayed such that, given the jackets of the music CDs and DVDs are laid out as objects in a three-dimensional virtual space, the three-dimensional versions of the jacket images for the music delivered hitherto, as viewed in the direction of sight from the position of a virtual camera, are generated. This is achieved by, for example, computation in the GPU 502 according to an instruction from the CPU 500.

The client 10 also displays a background image suitable for the type of the music (e.g., genre and mood) currently delivered on the liquid crystal display 404 or the like. The client 10 also generates a reflection image in which the background image or the jacket image is reflected in an image representing a water surface, in order to create a visual effect that makes the jacket image appear floating on the water surface. By flickering the reflection image by inducing a Perlin noise, an impression is given that the water surface ripples in accordance with the type of music or the beat of music.

The client 10 is also provided with a user interface for searching for a jacket image for the music delivered in the past. The user is allowed to browse jacket images by moving the virtual camera according to the inclination of the analog joystick 418 with respect to the jackets arranged in the three-dimensional space in the order of delivery, or moving the jacket while fixing the camera position. The user selects a desired jacket image by, for example, pressing the circular button of the buttons 420. There is further provided a user interface for purchasing the CD or DVD associated with the selected jacket image.

A user operation acquisition unit 14 acknowledges from the controller 540 the user's operational command for searching for a jacket.

The camera movement controller 16 changes the position and orientation of virtual camera in accordance with the user's operational command. The position and orientation of the virtual camera correspond to the view point and direction of sight of the user viewing the three-dimensional virtual space.

The object movement controller 18 moves the object of a jacket in accordance with the user's operational command. For example, when the user selects a particular jacket using the controller 540, the object movement controller 18 moves the object of the jacket toward the camera in the virtual space. The position information on the object of the jacket is stored in an object data storage 38, which is a part of the memory card 426. In addition to the object of the jacket, the object data storage 38 stores texture objects for displaying the title of the music tune and the name of the artist.

The channel selector 24 acknowledges the selection of a channel of radio broadcast provided by the streaming server 50 from the user manipulating the controller 540. Information on the channel selected by the channel selector 24 is transmitted to the streaming server 50 via, for example, the wireless LAN 530. For example, channels are categorized according to the mood of the music. By using the CPU 500 to analyze the components of the music, the music is categorized into several genres such as upbeat music, relaxing music, etc.

The three-dimensional image generator 30 generates a three-dimensional image in which the image of the jacket in the three-dimensional virtual space as viewed from the camera position is blended with the background image. The display unit 32 displays the three-dimensional image generated by the three-dimensional image generator 30 on the liquid crystal display 404.

The three-dimensional image generator 30 includes a reflection image generator 26 and a Perlin noise generator 28. The three-dimensional image generator 30 is mainly implemented by performing computation in the GPU 502 in accordance with an instruction from the CPU 500.

For example, the background image storage 34 is implemented as a part of the memory card 426, and the reflection image generator 26 is mainly implemented by performing computation in the GPU 502 in accordance with an instruction from the CPU 500. Like the reflection image generator 26, the Perlin noise generator 28 is mainly implemented by performing computation in the GPU 502 in accordance with an instruction from the CPU 500.

The client 10 is also provided with an interface of a media player for playing back music data purchased at the music distribution site 60 and stored in a local storage such as the hard disk drive 334. The media player is capable of playing back not only a music file purchased at the music distribution site 60 but also the music data stored in a local storage such as the hard disk drive 334. When a jacket image is embedded in the music file, the media player can use the embedded jacket image as the jacket image of the music file. Hereinafter, a description is given of the interface of the media player.

FIG. 11 shows an example of a screen of the media player displayed on the liquid crystal display 404 and used to select a channel. Ten images 150a-150j correspond to ten channels. In this case, the channels are provided for a plurality of types of mood of music, such as upbeat, relax, emotion, etc., defined by analyzing the music. The image representing each channel is a reduced version of the background image displayed on the liquid crystal display 404 when that channel is selected or a thumbnail created according to the background image.

The user may manipulate the controller 540 to select one of the ten images 150a-150j and select a corresponding channel. If ten or more channels are available (e.g., 12 channels), the user may scroll the screen by manipulating the controller 504 so as to select an image corresponding to another channel not shown. In this case, the user is selecting the image 150h at the lower center and the image 150h is displayed in a slightly larger size than the other images. The mood of the channel corresponding to the image 150h selected is displayed using characters toward the bottom of the liquid crystal display 404. In this case, "Relax" (reference numeral 152) is displayed. When the user enters a command to finalize the selection of the channel, the monitor will show the screen of FIG. 12A.

FIG. 12A shows an example of a normal screen displayed while the music stored in a local storage such as the hard disk drive 334 is played back in the channel selected by the user. The liquid crystal display 404 displays five jacket images 160a-160e in the three-dimensional virtual space as viewed from the virtual camera position. Jacket images (e.g., images embedded in the music data) grouped into the currently selected channel are arranged randomly. The jacket for the music currently played is displayed in front of the other jackets. At the lower right corner of the liquid crystal display 404 are displayed the title of the music tune "A" currently delivered (reference numeral 170), the name of the artist "a" (reference numeral 172), and the title of album "α" (reference numeral 174). In this case, the jacket images are schematically denoted by characters A-G. In practice, however, the jacket images of CDs and DVDs are displayed by texture mapping. Instead of randomly, the jacket images may be arranged in the order of purchase, in the order of Japanese syllabary, in the order of preference, etc.

Behind the jacket images 160*a*-160*e* is displayed the background image (reference numeral 180) corresponding to the selected channel. The array of the jacket images 160*a*-160*e* appears floating on the water surface. A background image 160 is reflected in the image representing the water surface (reference numeral 164). The images of the jackets are also reflected (reference numerals 162*a*-162*e*). The reflection image is flickered by a Perlin noise. As a result, the water surface appears rippling.

The icons representing the directional buttons 416 (reference numeral 166*a*), the select button 440 (reference numeral 166*b*), the start button 438 (reference numeral 166*c*), and the triangular button of the buttons 420 (reference numeral 266*d*) are displayed toward the bottom of the liquid crystal display 404. By pressing the button of the controller 202 corresponding to the icon, the music may be deleted from the list of favorites, the channel selection may be changed, the playback may be paused, or options may be displayed. These operations are presented for selection adjacent to the respective icons, using characters such as "Delete from the list of favorites" (reference numeral 168*a*), "Change channel" (reference numeral 168*b*), "Pause" (reference numeral 168*c*), "Options" (reference numeral 168*d*).

While the description above is directed to implementing the functions of a content player 100 using the game device 200 or the portable electronic device 400, the functions may also be implemented using a genera-purpose personal computer (PC). A description will now be given of the case where the functions of the client 10 are implemented using a PC.

Figure 15:
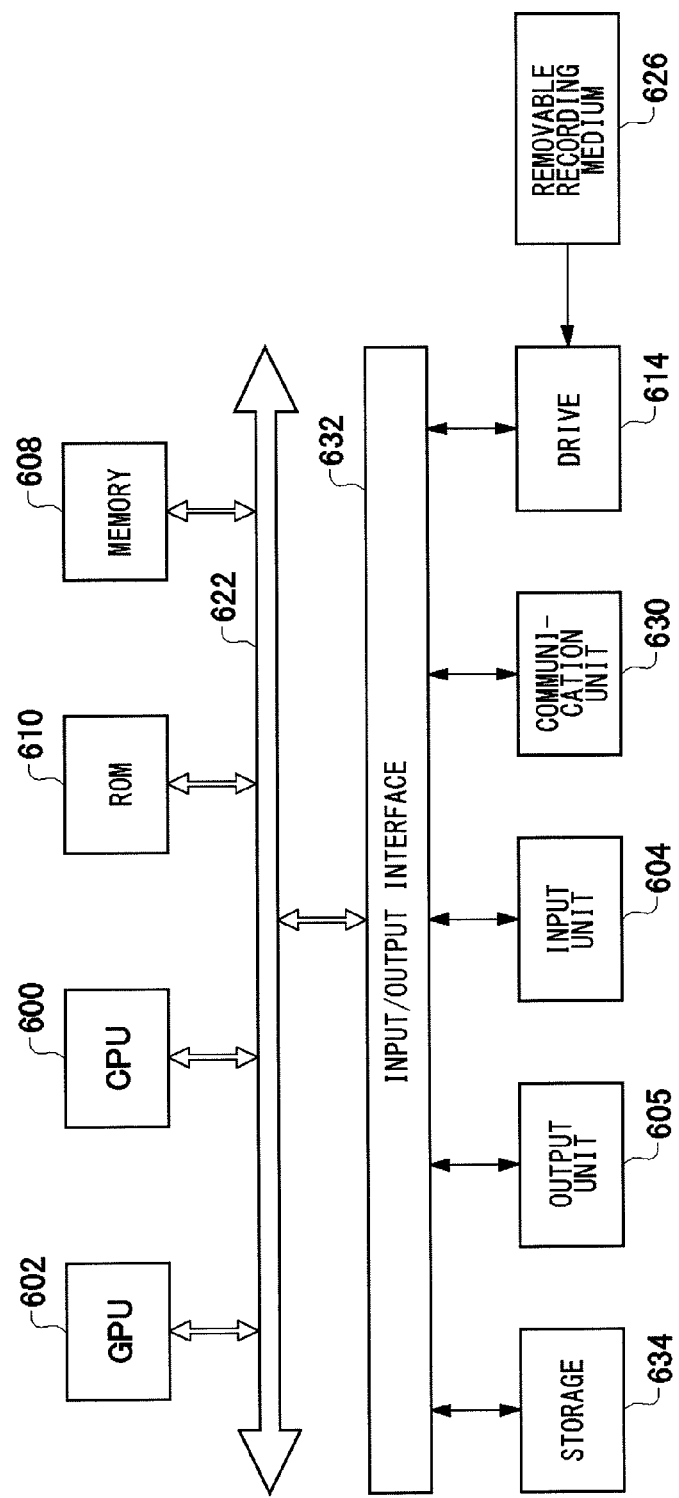
FIG. 15 shows the configuration of the internal circuit of a general-purpose PC.

FIG. 15 shows the internal circuit configuration of a general-purpose PC.

A general-purpose PC includes, as its principal components, a main CPU 600, a graphic processor unit (GPU) 602, an input/output processor 604, an output unit 605, a drive 614, a main memory 608, and a ROM 610. The main CPU 600 performs signal processing and control of various internal components based on various programs such as application programs for games, e-mails, and a Web browser. The GPU 602 performs image processing.

These components are connected with each other mainly through a bus line 622. An input/output interface is further connected to the bus line 622. To the input/output interface are connected a storage 634 implemented by, for example, a hard disk or a nonvolatile memory, an output unit 605 implemented by, for example, a display or a speaker, an input unit 604 implemented by a keyboard, a mouse, a microphone, etc., a communication unit 630 including, for example, an interface for USB, IEEE1394, etc., a network interface for cable LAN, wireless LAN, etc., a drive 614 for driving a removable recording medium 626 such as a magnetic disk, an optical disk, or a semiconductor memory.

The main CPU 600 executes an operating system program stored in the hard disk drive, etc. to control the entire operation of the PC. The main CPU 600 executes application programs, etc. read from an optical disk (e.g., CD, DVD, or BD) and loaded into the main memory 608, or those downloaded via a communication network, so as to control the operations (games, creation and editing of e-mails, or web page browsing, etc.) accordingly.

The main CPU 600 controls data input/output in the communication unit 630 and controls the drive 614. Specifically, the CPU 600 controls a signal from the input unit 604 obtained via the input/output interface 632 in accordance with the user operation, and data input/output with the removable recording medium 626.

The GPU 602 has a function of a geometry transfer engine for coordinate conversion and so on, and a function of a rendering processor. The GPU 602 draws an image according to rendering instructions from the main CPU 600 and then stores the drawn image into a non-illustrated frame buffer. More specifically, in the case that various application programs stored on an optical disk use three-dimensional (3D) graphics such as those of a game, the GPU 602 calculates, in a geometry operation process, the coordinates of polygons to constitute a three-dimensional object. Further, the GPU 602 performs, in a rendering process, various calculations to make an image that may be obtained by shooting the three-dimensional object by a virtual camera, i.e., the GPU 602 performs a perspective conversion (calculation of the coordinate values of the vertexes of each polygon constituting the three-dimensional object when the vertexes are projected on a virtual camera screen, and so on). The GPU 302 finally writes the obtained image data into the frame buffer. The GPU 602 then outputs a video signal corresponding to the thus made image.

For example, when the PC constructed as described above is turned on, initialization is performed by reading a BIOS from a nonvolatile memory forming the storage 634. The operating system program is subsequently read so that the main CPU 600 executes the operating system. By executing the operating system program, the main CPU 600 controls each component of the PC.

The client 10 of FIG. 4 is implemented by modules of the application program loaded into the main memory 608 and mainly executed by the main CPU 600 and the GPU 602 of the game device 200.

Described above is an explanation based on an exemplary embodiment. The embodiment is intended to be illustrative only and it will be obvious to those skilled in the art that various modifications to constituting elements and processes could be developed and that such modifications are also within the scope of the present invention.

In the above, the image of the water surface below the array of jacket images is described as being obtained by inducing a Perlin noise in the reflection image, where the reflection image is produced by reflecting the jacket images in the texture obtained by inverting the background image. For example, a designer may create the reflection image as a texture. The jacket images are reflected in the reflection image created by the designer and a Perlin noise is induced in the resultant image. Alternatively, an actual image of a lake, etc., may be used as the reflection image. In this case, the jacket images are reflected in the actual image of the lake and a Perlin noise is induced in the resultant image.

Still alternatively, the user may supply an image such as a photo that will form the background image. In this case, the reflection image may be created by inverting at least a part of the image supplied by the user and allows the jacket images to be reflected in the reflection image. An identification bit indicating whether the background image stored in the background image storage 34 is supplied by the user may be attached to the background image. In case the background image is supplied by the user, an inverted image is generated. An identification bit indicating whether a reflection image custom made by a designer is available may be attached to the background image. In case a reflection image is available for the background image, the reflection image created by the designer is used instead of generating an inverted version of the background image.

What is claimed is:

1. A non-transitory computer-readable medium having stored thereon a program, the program causing a computer to function as:
   a module operative to receive, over a network, an audio stream signal with one or more full audio compositions in sequence contained therein, to capture and playback in real time an audio composition upon receipt in the audio stream signal, and to simultaneously receive in real time over said network respective information regarding the audio composition, including a static representative image related to the audio composition;
   a module operative to display the static representative image related to the audio composition, and operative to arrange the representative image in a three-dimensional virtual space in respective order received from the audio stream signal;
   a module operative to flicker an image representing a water surface in order to create a visual effect that makes the representative image appear floating on the water surface,
   a module operative to store a sample of a full audio composition in a stream data storage during real-time playback of the full audio composition, wherein the sample is retained after playback and associated with the respective information regarding the full audio composition, and
   a module operative to refer to a prior audio composition of the audio stream signal sequenced prior to an audio composition currently streamed, in response to user operation, by using the respective information of the prior audio composition, and operative to acquire an associated sample retained for the prior audio composition and to play back the associated sample of the prior audio composition.

2. The non-transitory computer-readable medium according to claim 1, further comprising:
   a module operative to generate the image representing a water surface based on an image obtained by inverting a background image.

3. The non-transitory computer-readable medium according to claim 1, further comprising:
   a module operative to reflect the representative image on the image representing a water surface.

4. The non-transitory computer-readable medium according to claim 1, wherein
   the module for flickering the image representing a water surface flickers the image according to a movement of an object of the representative image in the three-dimensional virtual space.

5. The non-transitory computer-readable medium according to claim 1, wherein
   the module for flickering the image representing a water surface flickers the image according to a beat of the audio composition currently played back.

6. The non-transitory computer-readable medium according to claim 1, wherein
   the module for flickering the image representing a water surface flickers the image according to a type of the audio composition currently played back.

7. The non-transitory computer-readable medium according to claim 1, further comprising:
   a module operative to provide a user interface that allows a user to view a representative image associated with a prior audio composition, creating a visual effect that makes the representative image appear moving on the water surface.

8. The non-transitory computer-readable medium according to claim 7, further comprising:
   a module operative to impose a restriction when the user in a viewing process selects the representative image associated with the prior audio composition such that only the associated sample of the selected prior audio composition is played back.

9. A terminal apparatus having a processor, the terminal apparatus comprising:
   a display;
   an acquisition unit operative to receive, over a network, an audio stream signal with one or more full audio compositions in sequence contained therein, to acquire and playback in real time an audio composition upon receipt in the audio stream signal, and to simultaneously acquire in real time over said network a static representative image related with the audio composition;
   a three-dimensional image generating unit operative to display, on the display, a static representative image associated with an audio composition that was previously acquired with a static representative image associated with an audio composition currently being played back, arranging the images in a three-dimensional space;
   a sample storing unit to store a sample of a full audio composition in a stream data storage during real-time playback of the audio composition, wherein the sample is retained after playback and associated with the respective representative image of the full audio composition, and
   a user operation acquisition unit to acknowledge, using the processor, a user's operation of selecting a prior audio composition of the audio stream signal sequenced prior to an audio composition currently streamed, by using the respective information of the prior audio composition, wherein a prior audio composition is referred to and an associated sample retained for the prior audio composition thus stored is acquired and played back upon a user's selection of the prior audio composition,
   wherein the three-dimensional image generating unit flickers an image representing a water surface in order to create a visual effect that makes the respective static representative images appear floating on the water surface.

10. An image displaying method executed by a computer having a processor, the method comprising:
    acquiring over a network and displaying a static representative image in real time with capturing and playback of an audio composition from an audio stream signal, received of said network, with one or more full audio compositions in sequence contained therein, and arranging the representative image in a three-dimensional virtual space; and
    flickering, on a display using the processor, an image representing a water surface in order to create a visual effect that makes the representative image appear floating on the water surface, wherein a sample of a respective full audio composition is stored in a stream data storage during real-time playback of the audio composition, wherein the sample is retained after playback and associated with the respective static representative image of the full audio composition, and wherein, selection, in response to user operation, of a prior full audio composition of the audio stream signal sequenced prior to an audio composition currently streamed, an associated sample retained for the prior audio composition is acquired and played back.

* * * * *